(12) United States Patent
Lepley et al.

(10) Patent No.: US 11,728,760 B2
(45) Date of Patent: Aug. 15, 2023

(54) PIVOTABLE SUPPORT STRUCTURE FOR CROSS CANAL SOLAR ARRAY

(71) Applicant: TECTONICUS CONSTRUCTS, LLC, Tucson, AZ (US)

(72) Inventors: Benjamin Lepley, Tucson, AZ (US); George Cairo, Mesa, AZ (US)

(73) Assignee: TECTONICUS CONSTRUCTS, LLC, Tucson, AZ (US)

( * ) Notice: Subject to any disclaimer, the term of this patent is extended or adjusted under 35 U.S.C. 154(b) by 0 days.

(21) Appl. No.: 17/349,795

(22) Filed: Jun. 16, 2021

(65) Prior Publication Data

US 2022/0407449 A1 Dec. 22, 2022

(51) Int. Cl.
*H02S 20/30* (2014.01)
*F24S 25/12* (2018.01)

(52) U.S. Cl.
CPC ............... *H02S 20/30* (2014.12); *F24S 25/12* (2018.05)

(58) Field of Classification Search
USPC ........................................ 136/244, 246, 251
See application file for complete search history.

(56) References Cited

U.S. PATENT DOCUMENTS

| | | | | |
|---|---|---|---|---|
| 4,371,139 A | * | 2/1983 | Clark | F24S 20/67 |
| | | | | 248/237 |
| 4,421,943 A | * | 12/1983 | Withjack | F24S 25/70 |
| | | | | 136/246 |
| 5,143,556 A | * | 9/1992 | Matlin | F24S 25/12 |
| | | | | 136/251 |
| 9,109,814 B2 | * | 8/2015 | Patton | H02S 30/10 |
| 9,876,465 B2 | * | 1/2018 | Depauw | F16B 5/0685 |
| 11,114,975 B2 | * | 9/2021 | Mukherjee | H02S 20/32 |
| 2006/0086382 A1 | * | 4/2006 | Plaisted | F24S 25/10 |
| | | | | 136/246 |
| 2008/0105489 A1 | * | 5/2008 | Garrett | E04G 3/26 |
| | | | | 248/237 |
| 2008/0230047 A1 | * | 9/2008 | Shugar | H02S 20/32 |
| | | | | 126/569 |
| 2010/0175741 A1 | * | 7/2010 | Thorne | H02S 20/32 |
| | | | | 136/251 |
| 2010/0180884 A1 | * | 7/2010 | Oosting | F24S 30/455 |
| | | | | 126/574 |
| 2010/0243023 A1 | * | 9/2010 | Patton | F24S 25/61 |
| | | | | 136/244 |
| 2014/0224325 A1 | * | 8/2014 | Stoddard | F24S 25/12 |
| | | | | 136/259 |
| 2014/0290720 A1 | * | 10/2014 | Hockaday | F24S 25/617 |
| | | | | 136/251 |
| 2015/0075589 A1 | * | 3/2015 | West | F24S 25/13 |
| | | | | 136/251 |
| 2016/0365823 A1 | * | 12/2016 | French | H02S 40/34 |
| 2018/0062559 A1 | * | 3/2018 | Kapla | F16B 5/12 |

(Continued)

*Primary Examiner* — Joshua K Ihezie
(74) *Attorney, Agent, or Firm* — Quarles & Brady, LLP

(57) ABSTRACT

A cross canal support structure for photovoltaic cells is disclosed. The structure includes a major frame having disconnectable and hinged connections to anchors at its corners, on either side of the canal. The major frame carries a plurality of minor frames, which are inclinable at an angle with respect to the major frame with the use of fixed or adjustable mounting plates. The combination of the major frame's tilt and the minor frame tilt enables fabrication of support structures that hold panels at latitude inclination for various portions of a canal.

15 Claims, 24 Drawing Sheets

(56) References Cited

U.S. PATENT DOCUMENTS

| | | | |
|---|---|---|---|
| 2018/0076757 A1* | 3/2018 | Gross | H01L 31/048 |
| 2020/0076359 A1* | 3/2020 | Bahn | H02S 20/30 |
| 2020/0100473 A1* | 4/2020 | Rice | A01K 63/047 |
| 2020/0195192 A1* | 6/2020 | Sk | H02S 30/10 |
| 2021/0058024 A1* | 2/2021 | Luis y Prado | H02S 20/00 |
| 2021/0067086 A1* | 3/2021 | Mukherjee | F24S 30/455 |
| 2021/0214056 A1* | 7/2021 | Harrison | H02S 10/40 |

\* cited by examiner

Breach 06 lift panel section off

Breach 07 access to canal

Cow 04 – Remove cow

Cow 05 – replace panel frame, replace pins, plug back in

PIVOTABLE SUPPORT STRUCTURE FOR CROSS CANAL SOLAR ARRAY

STATEMENT REGARDING FEDERALLY-FUNDED RESEARCH AND DEVELOPMENT

This invention was made with government support under DE-SC0020022 awarded by the United States Department of Energy. The government may have certain rights in the invention.

BRIEF SUMMARY

The placement of photovoltaic arrays for solar generation of electricity is an area of current focus. In areas suitable for photovoltaic power generation, building rooftops and automobile parking lots are common locations for mounting solar arrays, in part, because these areas represent otherwise wasted space, where the location of solar panels does not interfere with human activity or sensitive species habitat.

Some work has been done regarding photovoltaic installations over canals, for example, irrigation or municipal water transportation canals. Canals, like rooftops and parking lots, also represent otherwise unused space. Moreover, canals are attractive areas for solar installations since, by shading the canals with the solar arrays, evaporative water loss from the canal surface can be reduced. Further, canals typically include periodic lift or pumping stations, when the canal is generally moving water uphill. Solar electricity generation systems for providing local electricity generation to drive these pumping stations, as well as for lighting, and safety and security monitoring equipment, are attractive, since they can obviate the need for connections to grid power in areas that may be remote.

Embodiments of the invention are directed to a pivotable and removable support structure for photovoltaic arrays capable of spanning a space, such as a canal. Structures according to exemplary embodiments include a major frame, preferably fabricated from rigid structural members such as structural steel. The major frame is removably and pivotably anchored to anchors located on either side of the space to be spanned. The major frame may support one or more minor frames that are installable at one or more angles with respect to a plane defined by the major frame. The angular orientation of each frame is adjustable, either during the fabrication process for the structural components, or during installation, depending on the requirements of the site.

One inventive embodiment is directed to a support structure for carrying a plurality of photovoltaic panels and spanning an underlying space, such as a canal. The support structure includes a major frame having sufficient structural rigidity and strength to span the space having only support at its corners, without underlying support. The major frame has a first dimension greater than a predetermined distance to be spanned and it defines a first plane. The structure also includes a plurality of minor frames configured to be supported by the major frame, each minor frame defining a second plane. Each of the minor frames is coupled to the major frame such that the second plane makes a predetermined or adjustable angle with the first plane. The minor frames may carry a plurality of solar panels.

The structure also includes a plurality of anchors arranged to provide vertical support at a plurality of points around an outside perimeter of the major frame, for example, on its corners. The major frame is coupled to one or more of the plurality of anchors by hinged connections on a first side and disconnectable connectors on a second side, such that the major frame is capable of being disconnected from the anchors on the second side and pivoted. In certain embodiments, the all connections of the major frame to the anchors are both hinged (i.e., rotatable) and disconnectable. In certain embodiments, the frame has a high side and a low side, and one or more columns connect the high side of the frame to one or more anchors. The structure may have hinged and/or disconnectable connections at both the high and low sides of the columns.

Another aspect is directed to a photovoltaic panel installation capable of spanning a space. The installation includes a plurality of minor frames, each carrying a plurality of solar panels. The minor frames are rectangular frames having two opposing long ends and two opposing short ends. The installation also has a rectangular major frame configured to support the plurality of minor frames. The installation has a first set of hinged connections on a first side of the major frame, and a second set of hinged connections on a second side of the major frame. Any or all of these hinged connections can be readily disconnected. The first set of hinged connections is configured to couple the first side of the major frame to one or more vertical columns such that the major frame is inclined at a non-zero relative to the horizontal. The minor frames are inclined at a non-zero angle with respect to a plane defined by the major frame.

Yet another aspect is directed to a method of building a photvoltaic installation. The method includes providing a plurality of anchors, a major frame, and a plurality of minor frames sized to fit within and be supported by the major frame. The method also includes providing a plurality of photovoltaic panels supported by the plurality of minor frames. The major frame is connected to the anchors using a plurality of rotatable, disconnectable connections, such that the major frame is inclined at a non-zero angle with respect to the horizontal. The minor frames are connected to the major frame such that each of the minor frames is inclined with respect to a plane defined by the major frame at a non-zero angle.

Embodiments of the invention have certain advantages. Previous efforts to locate photovoltaic arrays above canals can be seen in, for example, U.S. Pat. Nos. 8,875,450 and 9,027,288 to Conger. The PV array mounting structures disclosed in those references are cable truss systems, which are complex, difficult to install, and are fixed in location and orientation once installed. Support structures according to inventive embodiments, by contrast, are mechanically simpler, and may be installed at variable angles, both in terms of a major angle (e.g., the angle of the major frame with respect to grade), and the minor angles of minor frames orienting the PV arrays with respect to the major frame.

Additionally, one of the drawbacks of covering canals with solar panels or other structures is that objects or animals will sometimes fall into a canal and have to be removed. Also, silt or other debris will periodically collect in certain locations in a canal (e.g., in front of dedicated silt traps), and canals will periodically have to be dredged for removal of debris and to clear the canal. Moreover, it is a requirement of canal management, often set forth in regulation, that physical access must be maintained as to all areas of a canal. Maintaining physical access is important, not just for clearance of foreign objects as set forth above, but also for conducting routine maintenance and repairing canal breaches (e.g., breaches in the lining and/or berm) or repairing the berm or lining wherever needed. The pivotable PV support structures disclosed herein advantageously address these concerns because they can be temporarily decoupled from their anchors on one side of the span and pivoted up so that workers and equipment can get access to the canal underneath. Moreover, support structures may be temporarily decoupled from their anchors, completely removed from the canal, and easily reinstalled later. Inventive embodiments enable this by providing hinged connections that can be disconnected easily, by hand and/or with the use of simple hand tools, which may be done by canal maintenance personnel rather than specialized construction contractors. Additionally, support sections may be pivoted up using rudimentary, light-duty equipment (e.g., a forklift, jack or the like), and may be removed with a light mobile crane, cherry picker, or the like. Again, this permits canal maintenance personnel to get access to all points of the canal themselves, without the requirement to call in third party personnel.

Additional advantages will become clear upon review of the foregoing detailed description of the preferred embodiments.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
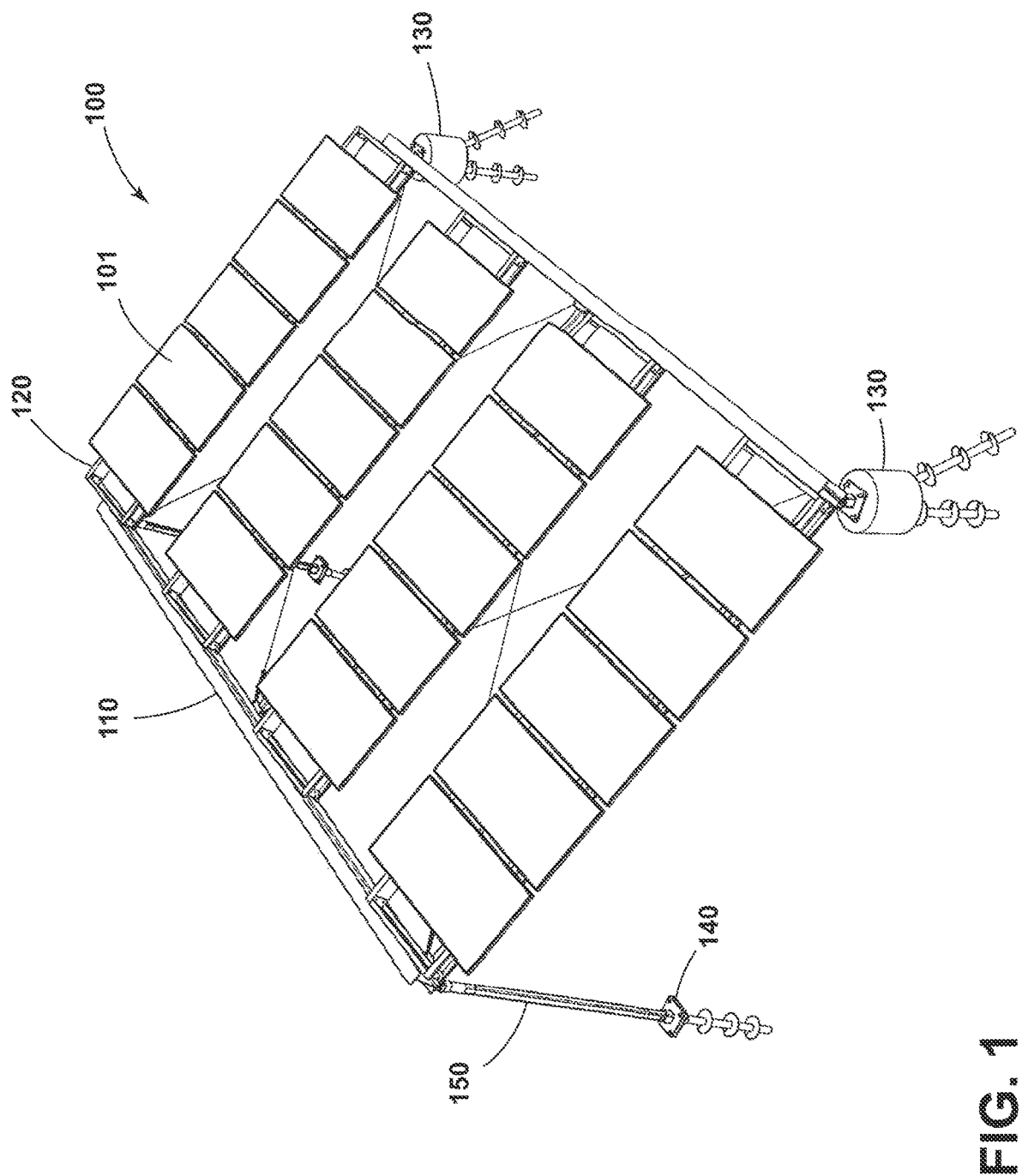
FIG. 1 is a schematic illustration of a photovoltaic panel installation for spanning a space such as a canal.
Figure 2:
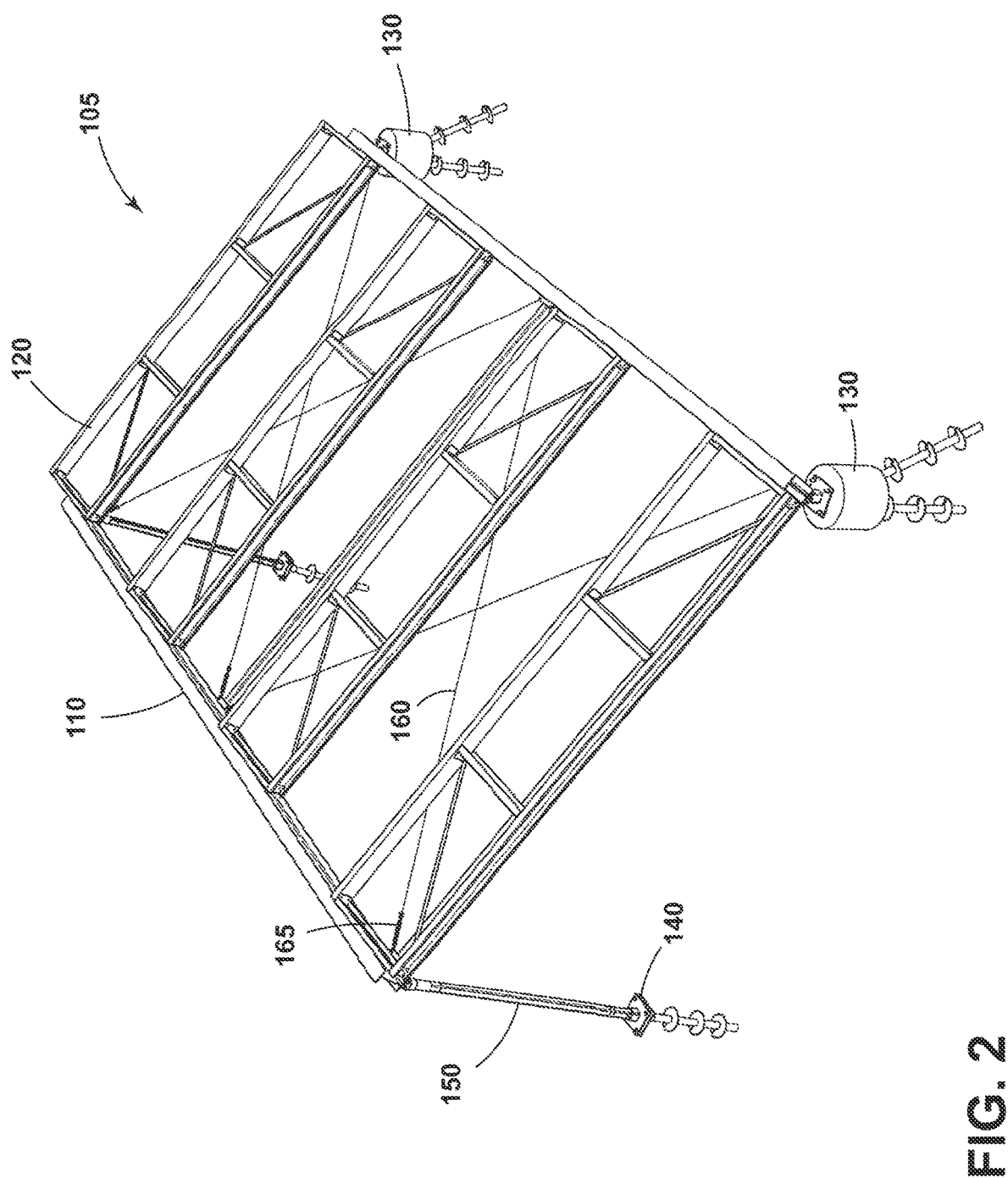
FIG. 2 shows an exemplary support structure for the installation of FIG. 1.

Referring now to FIG. 1, there is shown a PV installation 100 using an exemplary support structure. The installation of FIG. 1 includes a plurality of PV panels 101 flush mounted to minor frames 120, which in the exemplary embodiment are rectangular. Installation 100 also includes a major frame 110, described in more detail below in reference to FIG. 3. Major frame 110 is supported by connections to a plurality of anchors 130, 140, which connections are pivotable and easily disconnectable, as will be described below. Major frame is inclined with respect to grade or the global horizontal at a first angle determined in large part by the length of columns 150 that couple major frame to anchors on one side of the installation. Major frame 110 carries a plurality of minor frames 120, which can be inclined at one or more angles with respect to a plane that contains major frame 110. Installations such as that of FIG. 1 may be combined in an array of installations, such as is illustrated in FIGS. 16 and 17. FIG. 2 shows the installation 100 of FIG. 1, but with the PV panels 101 removed for clarity. As can be seen in FIGS. 1 and 2, support structure 105 is capable of supporting an array of PV panels in a span across some underlying space such as a canal. Typical support structures according to the inventive embodiments are capable of spanning canals ranging in width from 8 to 140 feet, with a typical width being 40 feet, without underlying support, i.e., as a clear span with support only at the corners.

Referring now to FIGS. 1 and 2, while the illustrated major frame 110 and minor frames 120 are rectangular, this is not a limiting requirement. The shape of the minor frame will be preferably determined by the shape of the PV panels it is configured to carry, and concerns about the packing density of those panels. Major Frame 110's shape and dimensions may be determined by considerations such as the length and shape of the span the structure is intended to cover. Spacing of minor frames 120 within major frame 110 may vary, and may be determined by concerns regarding packing density of PV cells within major frame 110, cost of PV panels, the desired inclination angle of the panels, and shading considerations. These considerations will be discussed in further detail below with respect to FIGS. 18 and 19.

Figure 3:
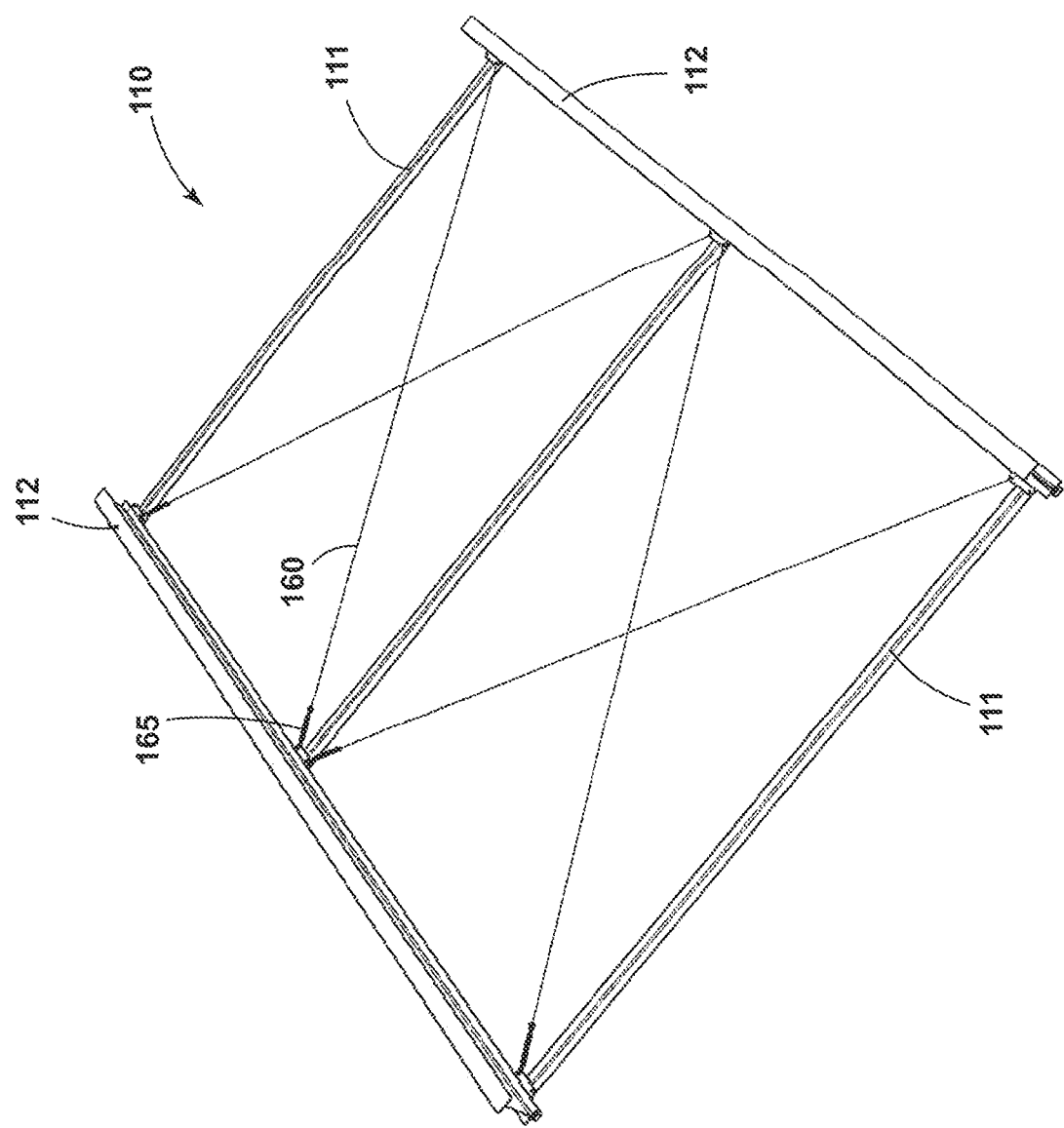
FIG. 3 shows additional detail regarding a major frame of the support structure of FIG. 1.
Figure 4:
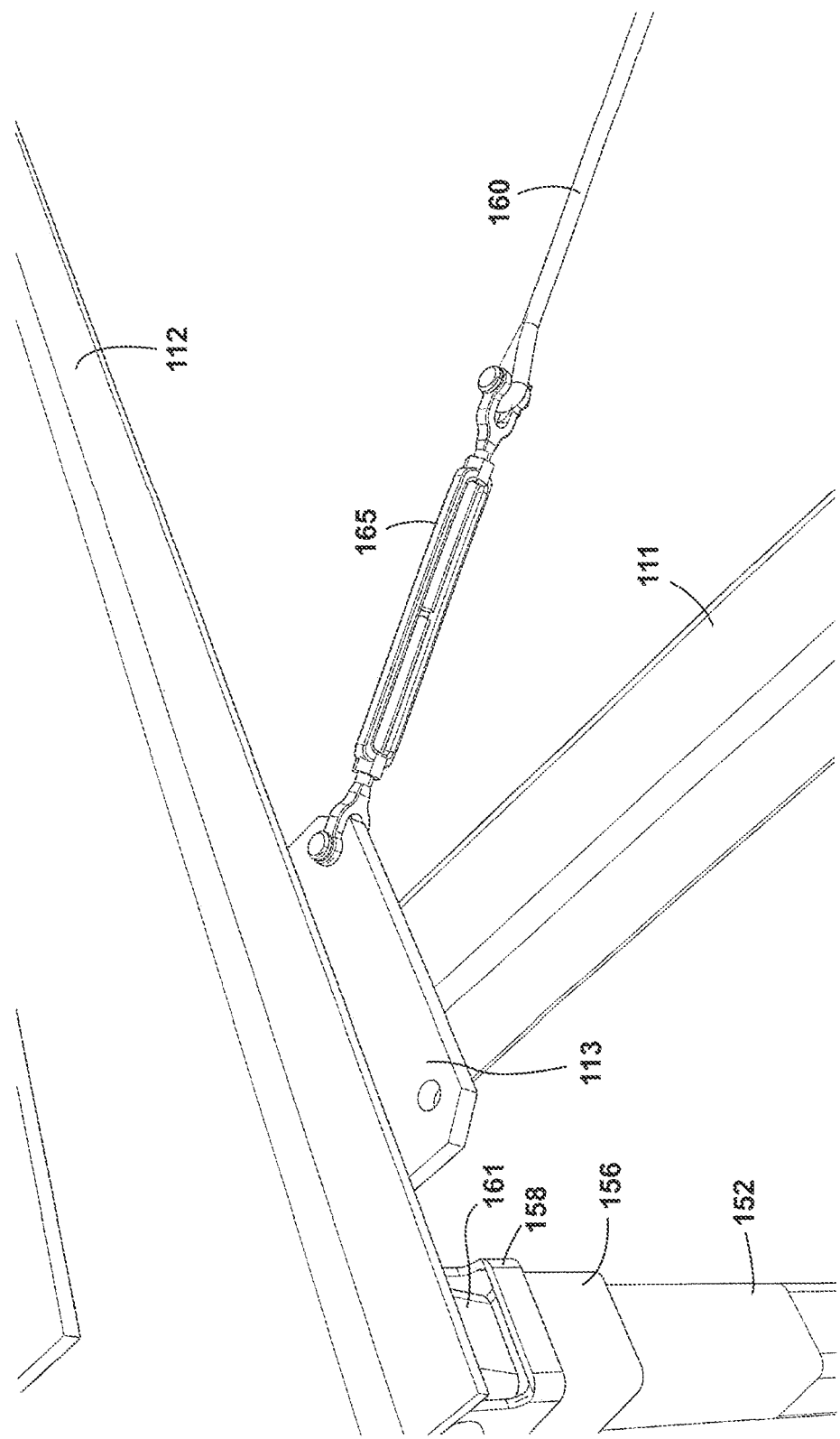
FIG. 4 shows additional detail of the major frame of FIG. 3.

Referring now to FIGS. 3 and 4, there is shown an exemplary major frame 110 according to an inventive embodiment. In the drawing of FIG. 3, minor frames have been omitted for clarity. In the example of FIG. 3, major frame 110 has a rectangular perimeter formed by a pair of mutually parallel spaced apart girders 112, defining the long edges of the rectangular frame. The girders 112 are tied together by a series of cross struts 111 arranged at right angles to girders 112, and arranged such that struts 111 have a top surface that lies below a bottom surface of girders 111, which can be seen more clearly in FIG. 4. In this manner, frame 110 defines an open volume between girders 112 for attachment of minor frames 120. Minor frames 120 may also be packed within this space during transport to a site and prior to final installation, at which time they may be tilted up and fixed in theft final installed position.

Girders 112 and struts 111 are preferably made of structural steel, with girders 112 being preferably made of steel i-beams, and struts 111 preferably being made of tubular steel members having a generally square cross section. As a general matter, struts, girders, bridge portions, purlins, and other linear forms disclosed herein may be made of any suitable material, e.g., steel, aluminum, wood, polymer, or carbon fiber or glass reinforced polymer, and in any suitable cross sectional shape, e.g., i-beam, tubes of any cross section, straps, rods, or c-channels. Girders 112 and struts 111 are mutually attached by welding, with or without the use of intermediate welding plates (e.g., 113) and/or L brackets. Major frame 110 may include cross cables 160 and tensioning devices such as turnbuckles 165 to provide resistance to torsional forces acting to deform the rectangle of major frame 110.

Figure 5:
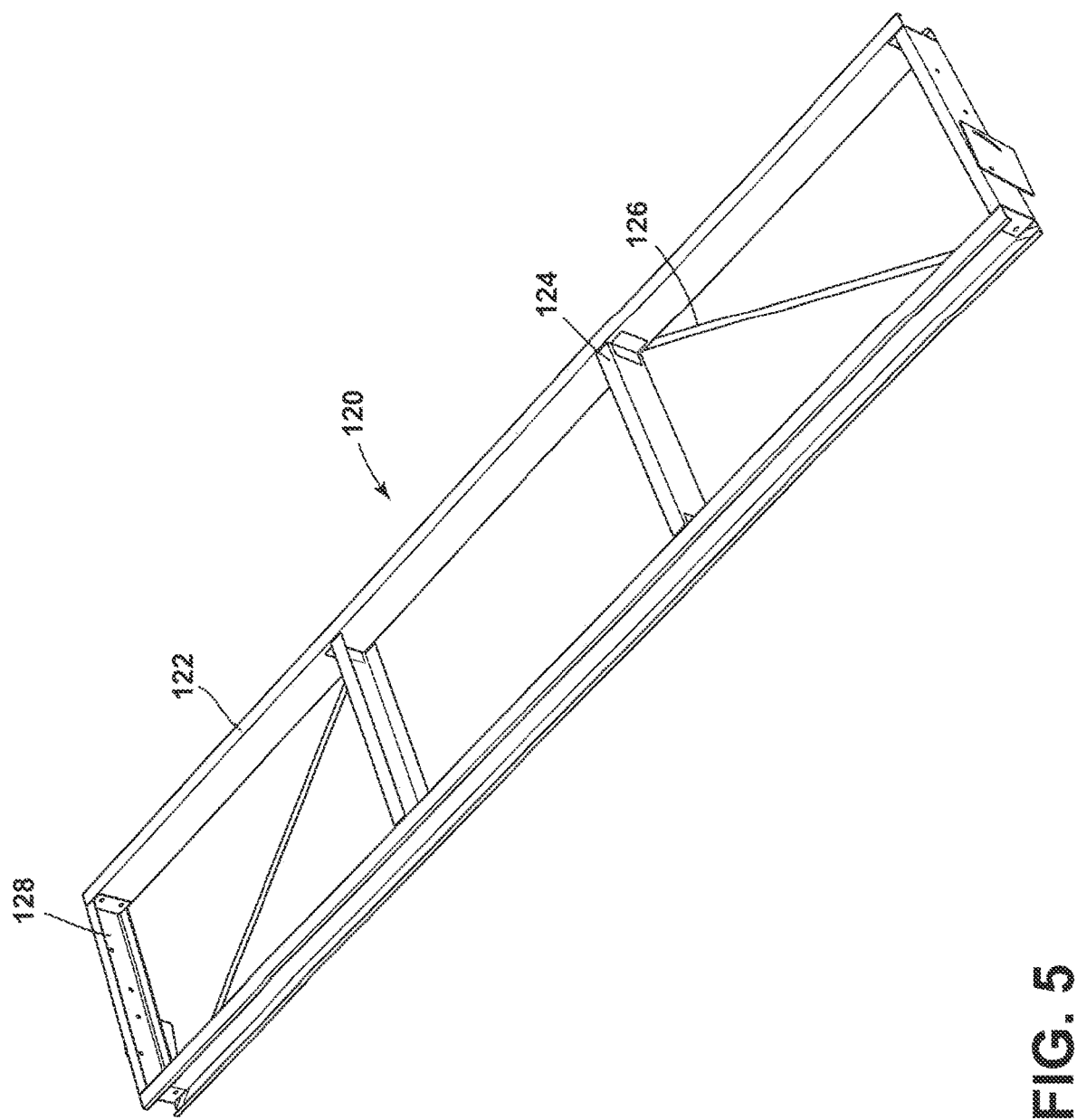
FIG. 5 shows additional detail regarding a minor frame of the support structure of FIG. 1.

Referring now to FIG. 5, there is shown an exemplary minor frame 120 according to an inventive embodiment. Minor frame 120 is preferably a rectangle having a long dimension sized to fit within the space defined by girders 112 in the major frame 110. Minor frame 120's rectangular perimeter is formed by a pair of mutually parallel, spaced apart purlins 122 connected by, at right angles, a series of bridge pieces 124. Strapping 126 may be provided for additional rigidity. The short ends of minor frame 120 are formed by end brackets 128, which serve as attachment points to the girders of the major frame 110, as will be discussed below. Purlins 122, strapping 126 and end brackets may be mutually attached with the use of intermediate welding plates or L brackets. In the installation of FIG. 1, PV panels 101 are coupled to minor frame 120 such that they sit flush with a top surface of the rectangle defined by minor frame 120 (i.e., the panels are parallel to the plane of the minor frame 120). This is not a requirement, however. R is contemplated that PV panels may be individually or collectively mounted at non-zero angles with respect to the minor frames 120 to which they are attached.

Figure 6:
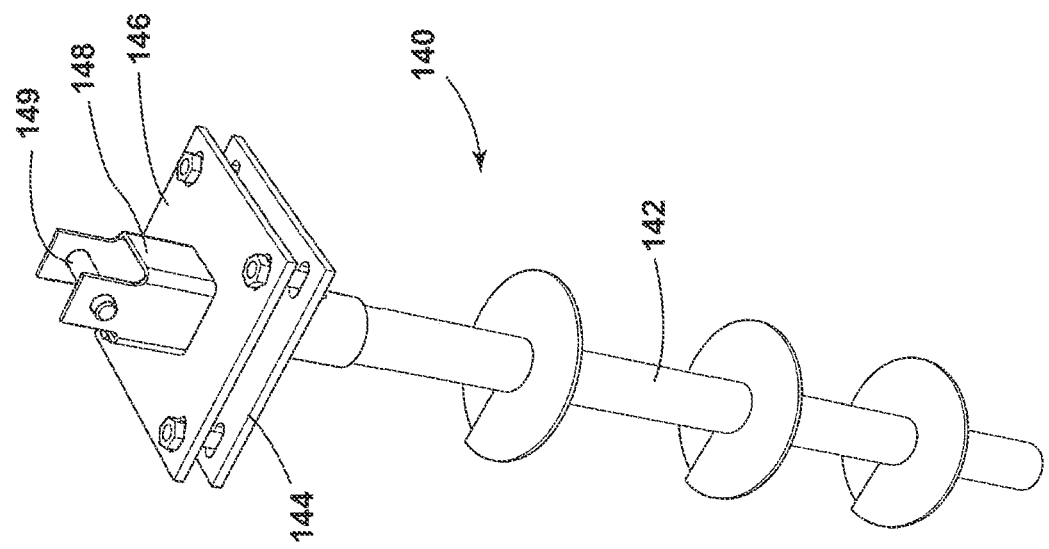
FIGS. 6-8 show exemplary anchor structures usable with the support structure of FIG. 1.

Referring now to FIG. 6, there is shown a first anchor structure for a PV mounting structure of the present disclosure. Anchor 140 has a helical pile 142, which is rotationally driven into the ground. Pile 142 is coupled to a base plate 144, for example, by welding base plate 144 to a short section of tubular steel having an inside diameter that is greater than an outside diameter of a proximal (upper) end of helical pile, slipping the short section of tubular steel over the proximal end of the helical pile, and then securing it to the helical pile by welding. Base plate 144 serves as a leveling plate in conjunction with joint plate 146, to which it is coupled with a plurality fasteners including through bolts and nuts. Nuts located between the base plate 144 and joint plate 146 may be adjusted to level joint plate 146 with respect to the global horizontal. Base plate 146 carries foundation joint 148, which is coupled via a hinge pin to a lower end of a column, as will be described. In the embodiment of FIG. 6, foundation joint is formed of a piece of square tubular steel that has been cut such that it has two protruding tabs or ear sections, though which two holes are cut, the centers of which are located on an axis oriented to be normal to and centered on two opposing faces of the tubular steel foundation joint and parallel to the plane of the joint plate. These holes receive a hinge pin 149, having a proximal end with a diameter larger than the diameter of the foundation joint through holes. The hinge pin 149 is secured to the foundation joint by its large diameter proximal end and the placement of a nut, cotter pin, or the like in or on its distal end (see FIG. 16b). The hinge pin 149 may or may not be configured to spin freely within the foundation joint 148.

Figure 7:
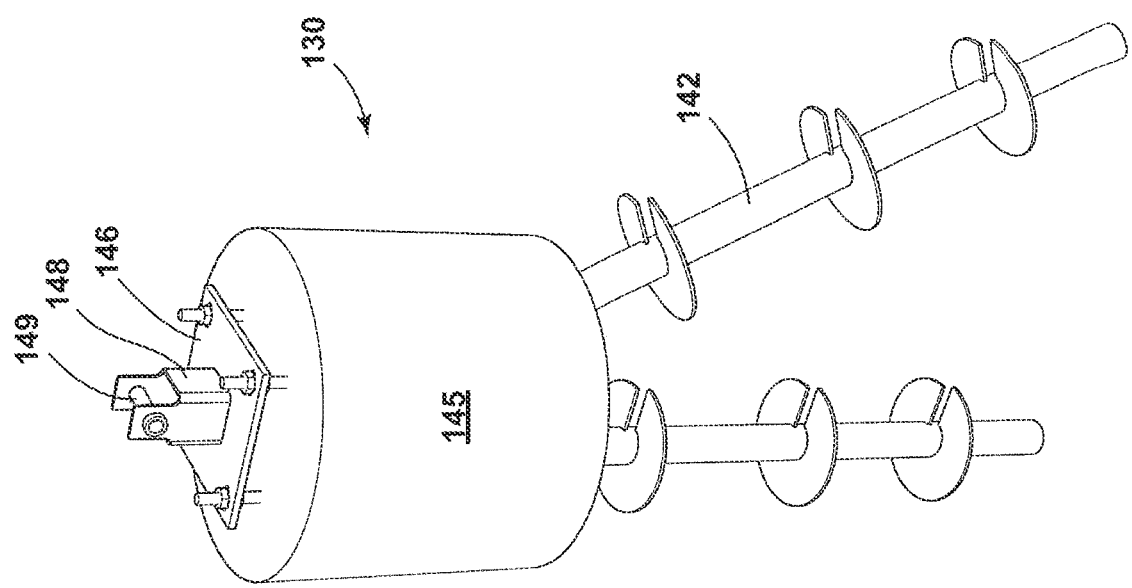
Figure 11:
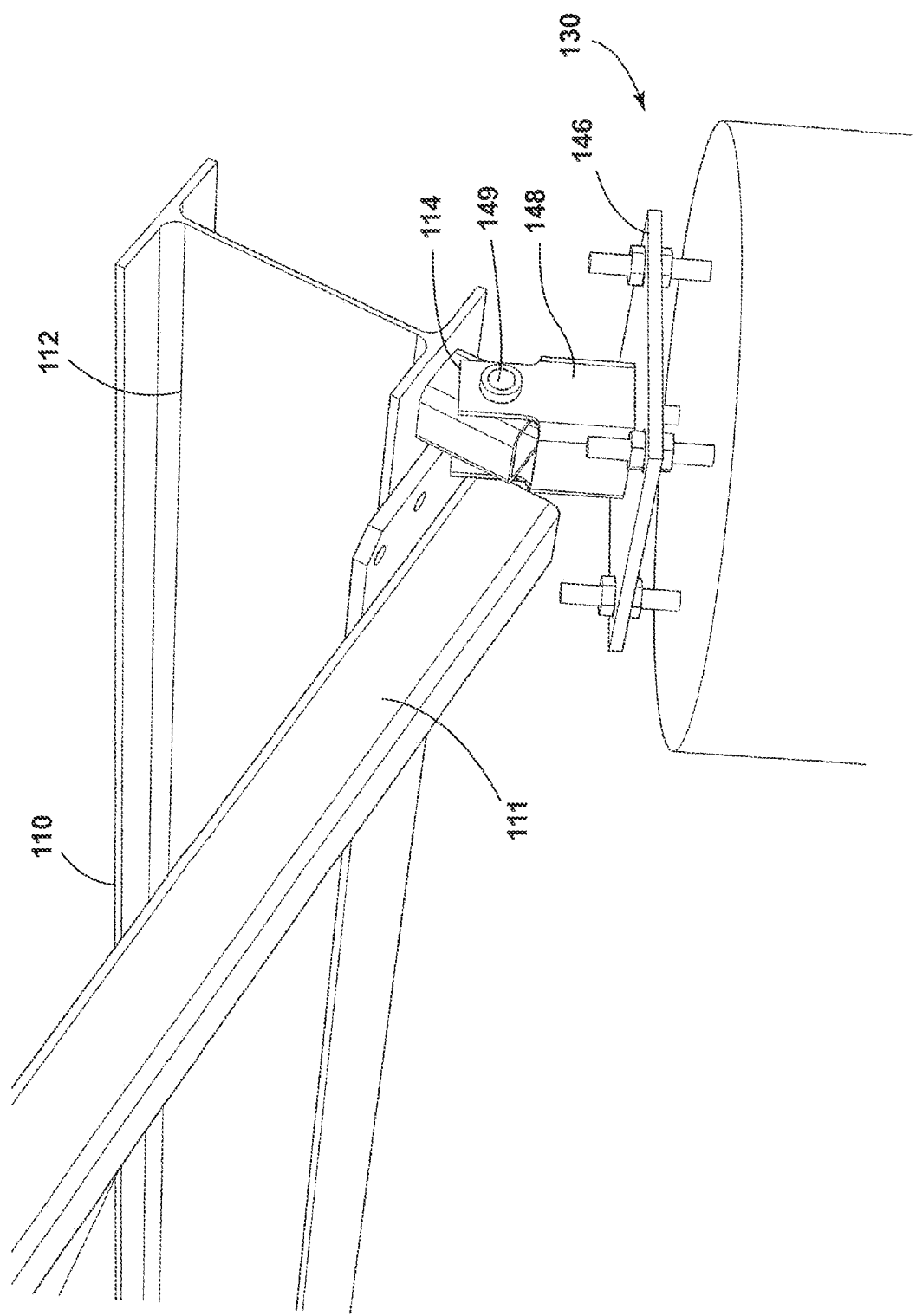
FIG. 11 shows additional detail of a pivotable connection between a major frame and the anchor structure of FIG. 6.

Referring now to FIG. 7, there is shown an alternative anchor structure usable with the installation of FIG. 1. The anchor structure of FIG. 7 includes one or more helical piles, 142, the proximal (upper) ends of which are coupled to a concrete anchor block 145, which in certain embodiments, is poured around the proximal ends of piles 142 after piles 142 are installed in the ground. Anchor 130 also includes a joint plate 146, which may be anchored to anchor block 145 by lag bolts set in still wet concrete, expanding concrete anchor bolts or the like. Joint plate 146 may be leveled with respect to the global horizontal by the use of nuts or the like underneath joint plate 146, for example, as is shown in FIG. 11. Anchoring structure 130 also includes foundation joint 148 and hinge pin 149, as described above in connection with FIG. 7 above.

Figure 8:
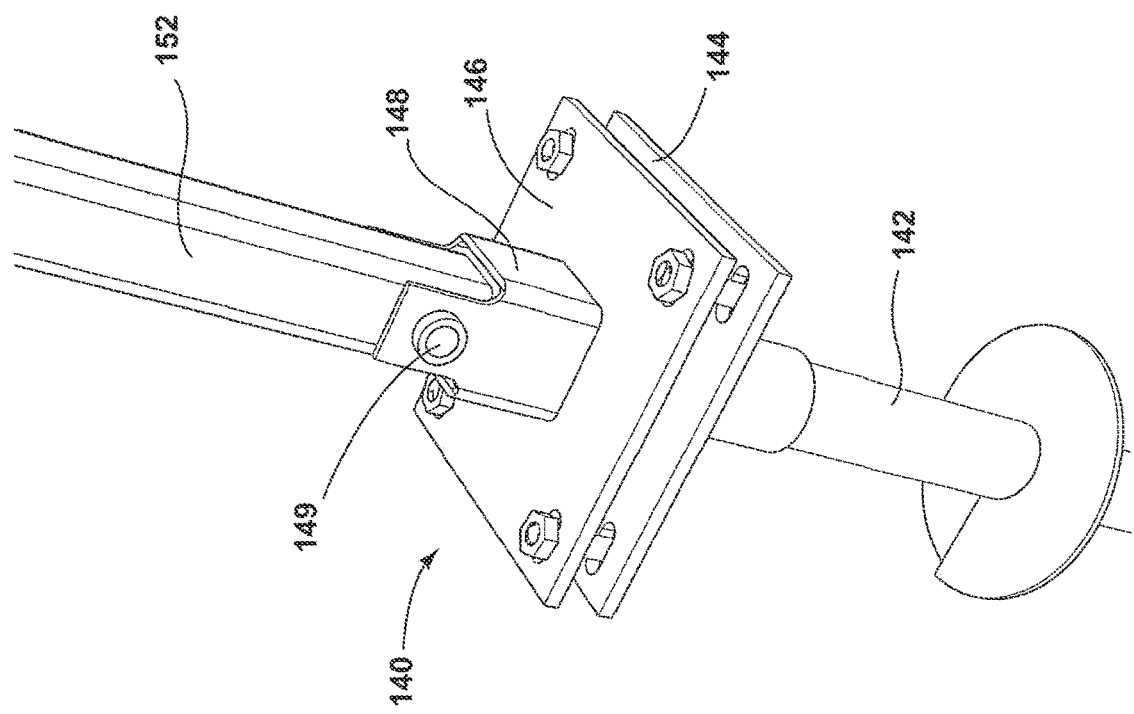
Figure 9:
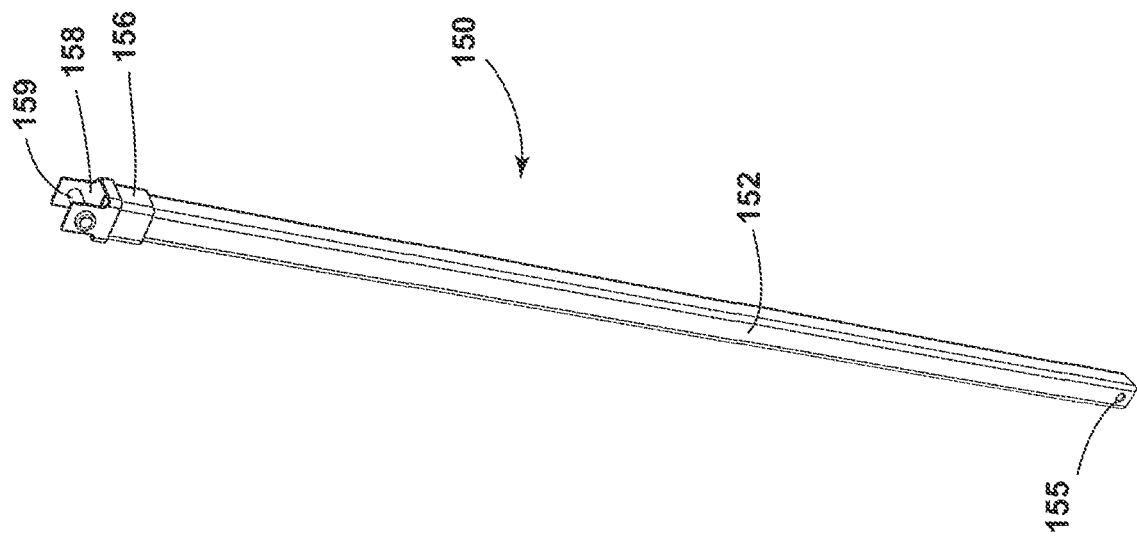
FIG. 9 shows a column usable with the support structure of FIG. 1.

Referring now to FIGS. 8 and 9, there is shown an arrangement for making a rotatable hinged connection between a support column and an anchor structure, e.g., anchor structure 140 of FIG. 6. As seen, foundation joint 148, which has been coupled to joint plate 146, is sized to receive a vertical portion 152 of column 150 (see FIG. 9). Vertical portion 152 has through holes in opposing sides that are aligned to be collinear with through holes provided in foundation joint 148. Hinge pin 149 passes through both pairs of holes and is fixed, e.g., with a cotter pin or nut on the far side of the view of FIG. 8.

In a preferred arrangement, the bottom end of vertical section 152 of column 150 rests on and is supported by joint plate 146, such that several inches (e.g., 4 inches) of vertical section 152 are captured circumferentially by foundation joint 148. This arrangement tends to prevent vertical portion 152 from tilting or rotating with respect to joint plate 146. In cases where joint plate 146 has been leveled, this arrangement ensures that vertical portion 152 and column 152 are vertical. In alternative embodiments, the long axis of column's vertical section 152 is inclined with respect to the horizontal, but is perpendicular to joint plate 146. This may occur when joint plate 146 is off level, but has been installed intentionally at an angle. Such an installation may occur where vertical section 152 and helical pile 142 are installed to be mutually parallel and co-linear, but off vertical.

In alternative embodiments, the through holes in vertical portion 152 are placed father down such that the bottom end of vertical portion 152 floats, and weight of the structure is supported by hinge pin 149. In yet another variation, the portion of vertical section 152 extending below the column's through holes is sufficiently short such that it sits above the opening defined between the tabs of the foundation joint. This allows the column 150 to rotate with respect to the foundation joint (about the axis of hinge pin 149), such that column 150 may have a non-vertical angle. In yet other embodiments the inner diameter of foundation joint 148 is chosen to be considerably larger than (e.g., an inch on either side) than the outer diameter of vertical portion 152. This allows the vertical portion 152 to be inclined a slight degree with respect to the plate of joint plate 146 while still being supported by joint plate 149.

Still referring to FIGS. 8 and 9, a column 150 usable to elevate one end of the major frame such that it has a major angle with respect to grade or the global horizontal is shown. Column 150 includes a vertical portion 152. As is described above, at a lower end of vertical portion 152, column 150 includes a pair of through holes 155 arranged to receive hinge pin 149. In alternative embodiments, vertical portion 152 may be welded to a sleeve that slips over a lower portion of vertical portion 152, which sleeve may include through holes for receipt of the hinge pin.

Figure 10:
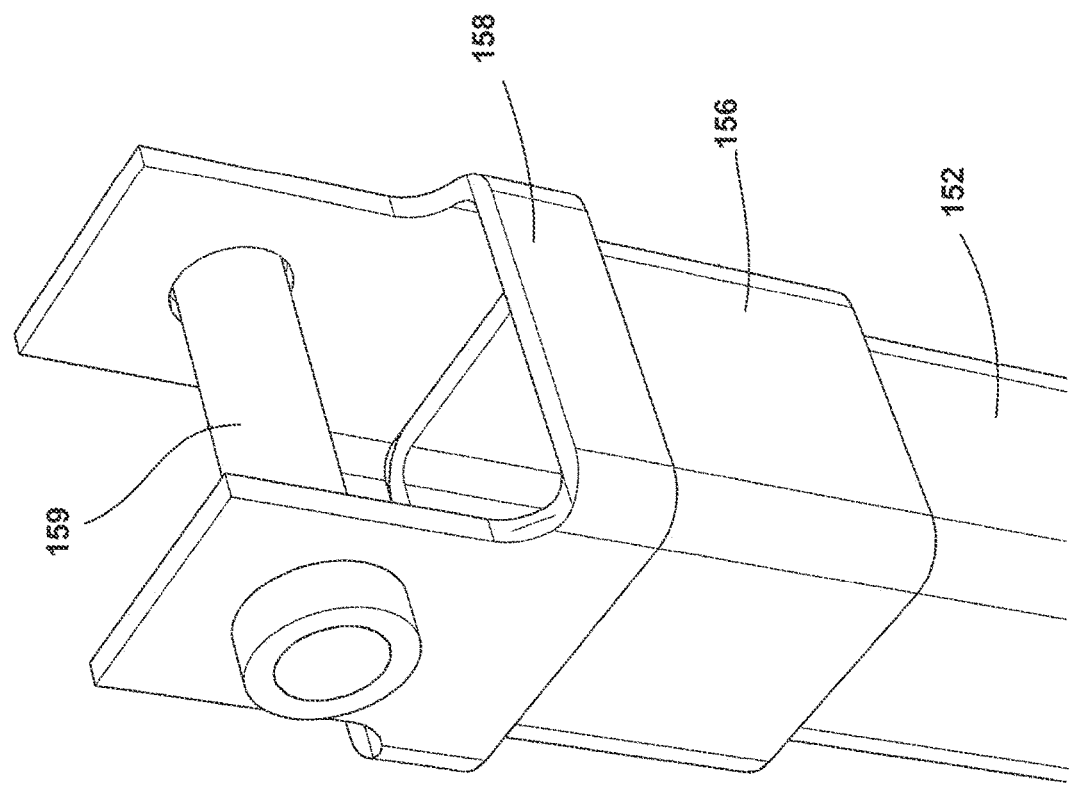
FIG. 10 shows additional detail of a pivotable connection between a column and the support structure of FIG. 1.

Referring now to FIGS. 9 and 10, an upper portion of vertical portion 152 is coupled to upper weld tube 156, which is a relatively shorter length of tubular steel having an inside maximal dimension or diameter greater than the outside maximum dimension of vertical portion 152, such that it can slip over an upper and of vertical portion 152 and be welded into place. Upper weld tube 156 is sized such that column joint 158, can be slipped over upper weld tube 156 and welded into place. Column joint 158, like foundation joint 149, may be formed from a piece of square tubular steel that has been cut such that it has a pair of protruding ears or tabs, though which a pair of holes 157 have been cut to receive an upper hinge pin 159. In alternative embodiments column joint 158 may be coupled directly to vertical portion 152 without the use of intervening weld tubes. In yet other embodiments, the outer diameter of upper weld tube 156 is less than the inner diameter of vertical portion 152, such that it slips inside vertical portion 152. This arrangement permits the inner diameter of column joint 158 to be the same as that of vertical portion 152, and indeed, enables vertical portion 152 and column joint 158 to be fabricated from the same type of tubular steel.

Referring now to FIG. 11, there is shown a connection between anchor structure 130 and a major frame 110 of a PV installation, e.g., the installation of FIG. 1. As can be seen, girder 112 of major frame 110 is coupled to a frame weld tube 114, which in the exemplary embodiment is a short piece of tubular steel having an outside diameter sized to fit within the space defined by the tabs of foundation joint 149. In certain embodiments frame weld tubes 114 may be fabricated from the same tubular steel as the vertical portions 152 of columns 150. In cases where girder 112 is an I-beam, frame weld tube 114 may be coupled to girder 112 by welding to the bottom flange of the girder 112. Frame weld tube 114, like column 150, includes a pair of through holes arranged to line up with the through holes in foundation joint 149. Frame weld tube 114 (and therefore major frame 110) is rotatably coupled to foundation joint 148 (and therefore anchor 130) by pin 149, which passes through the two pairs of through holes and is secured, again, for example, by a cotter pin or nut on the non-illustrated side.

Figure 12:
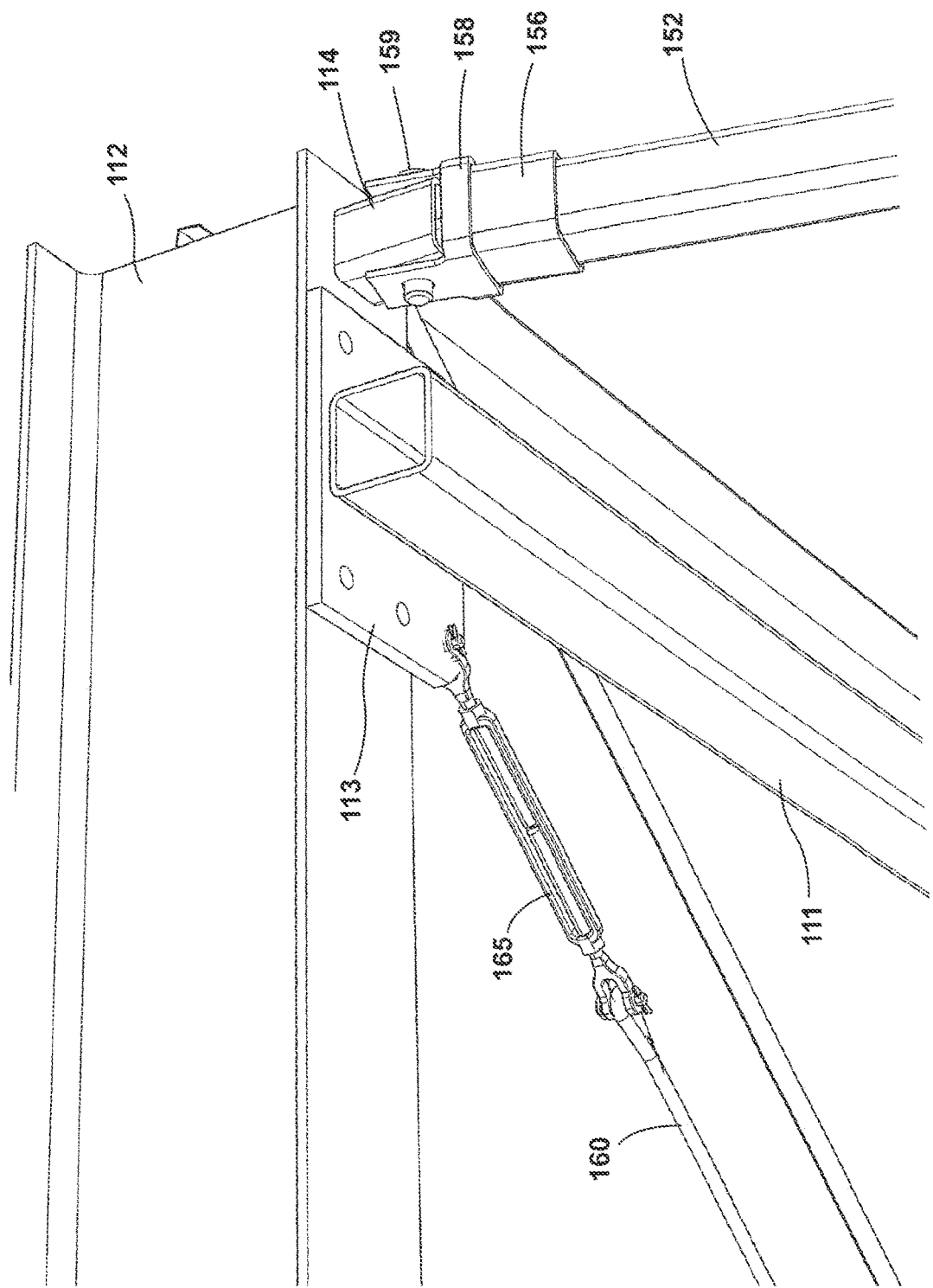
FIG. 12 shows additional detail of a pivotable connection between a column and the support structure of FIG. 1.

Referring now to FIG. 12, there is shown a connection between column 150 (connected to, for example, anchor 140), and major frame 110 of a PV installation, e.g., the installation of FIG. 1. As in the connection shown in FIG. 11, girder 112 of major frame 110 has attached thereto a frame weld tube 114. This attachment, as above, may be made by welding. Frame weld tube, in the example of FIG. 12, is a short piece of tubular steel having an outside diameter sized to fit within the space defined by the tabs of column joint 158. In certain embodiments frame weld tube 114 may be fabricated from the same tubular steel as the vertical portions 152 of columns 150. In cases where girder 112 is an I-beam, frame weld tube 114 may be coupled to girder 112 by welding to the bottom flange of the girder 112. Frame weld tube 114, like column joint 158, includes a pair of through holes arranged to line up with the through holes in column joint 159. Frame weld tube 114 (and therefore major frame 110) is rotatably coupled to column joint 148 (and therefore anchor 140) by pin 159, which passes through the two pairs of through holes and is secured, again, for example, by a cotter pin or nut.

As can be seen in both FIGS. 11 and 12, frame weld tubes 114 are sized such that they can rotate within the gap defined by the tabs in either column joint 158 or foundation joint 148. This is accomplished, in the illustrated embodiments, by choosing a length for weld tubes 114 that is sufficiently short such that it does not interfere with the short perimeter walls of the joints 158, 148 as the weld tubes 114 rotate.

Referring again to FIGS. 1-3, major frame 110 is coupled, along one end, to an anchor structure (e.g., 130) by placing a hinge pin through the holes of anchor joint 148 and through corresponding holes in a frame weld tube, which is described above. This establishes a first hinged, rotatable connection for the major frame along its low side, which connection may be disengaged by removal of pin 149. At its other end (i.e., the high side), major frame 110 is coupled to an upper end of column 150 by placing a hinge pin (159) through the holes of column joint 158 and through corresponding holes in a frame weld tube, which is described above. Column 150 is anchored to an anchor structure 140 by pinning vertical portion 152 to anchor joint 148 with pin 149. The result of this arrangement is the major frame being secured via at least two pairs of hinged, rotatable and disconnectable connections, one pair of connections at each anchor on the frame's low side, and one pair of connections between the frame and a pair of columns at the frame's high side. Either the high side or the low side pair of connections can be temporarily disengaged to allow the structure to be pivoted (e.g., upward, using a crane or the like), to gain access to the area beneath the frame (e.g., to remove something from an underlying canal). The major angle of major frame 150 with respect to the global horizontal or grade may be controlled, for example, by selecting pre-cut column vertical portions 152 of varying height or by cutting the column vertical portions to length on site.

As is described above, in alternative embodiments, a third pair hinged, rotatable and disconnectable connections can be made between the bottom portion of the vertical portions 152 of columns 150 at the anchor joints 148 on anchors 140. This would allow columns 150 to be non-level during installation with respect to their anchors. This is also advantageous to accommodate for slight misalignment that might otherwise occur from fabrication tolerances or errors, for example, errors or tolerances in the span length of the major frame defined by the lengths of the struts of the major frame.

While the embodiments described above have concrete anchors 130 on the low side of the support structure and non-concrete anchors 140 on the high side of the support structure, this is not a requirement. It will be appreciated, however, that installation is made easier by the placement of concrete anchors on one side of the frame (e.g., 130), and anchors on the other side of the frame that use only augurs or helical piles. In an exemplary installation process, the structure is built starting with placement of the low side anchors. In such a method, one or more helical piles 142 are first driven into the ground, concrete blocks 145 are poured over the upper ends of the piles, and the joint plates 146 are then fixed to the concrete blocks 145. The resulting structure is anchor 130. After concrete blocks 145 cure, using a crane, major frame (with or without the minor frames and/or PV panels pre-installed) is pinned to anchors, and inclined across the span at its designed-for angle of inclination. Columns 150 may then be pinned to the upper weld tubes of the frame, made plumb (as they can freely rotate), and then the positions for the high side anchors (140) can be marked. Those anchors can then be installed rapidly, leveled, and the installation can be fixed in its final position.

In one preferred installation configuration, columns 150 and anchors 140 are installed such that they are off level, but are orthogonal to the plane of the major frame in its final installed position. For such a configuration, assembly proceeds as discussed above, but instead of locating the anchors 140 to be directly below the upper edge of the major frame 110 (as with plumb oriented columns), the high side anchors are located so that columns 150 are orthogonal to the plane of the major frame. Once those locations are marked, the high side anchors are installed and the columns and frame is fixed in place.

Returning now to FIG. 1, as can be seen, in installations according to inventive embodiments, minor frames 120, which carry PV panels 101, may be inclined at non-zero angles with respect to major frame 110. This may be accomplished according to the methods and configurations that will now be described in reference to FIGS. 13-15.

Figure 13:
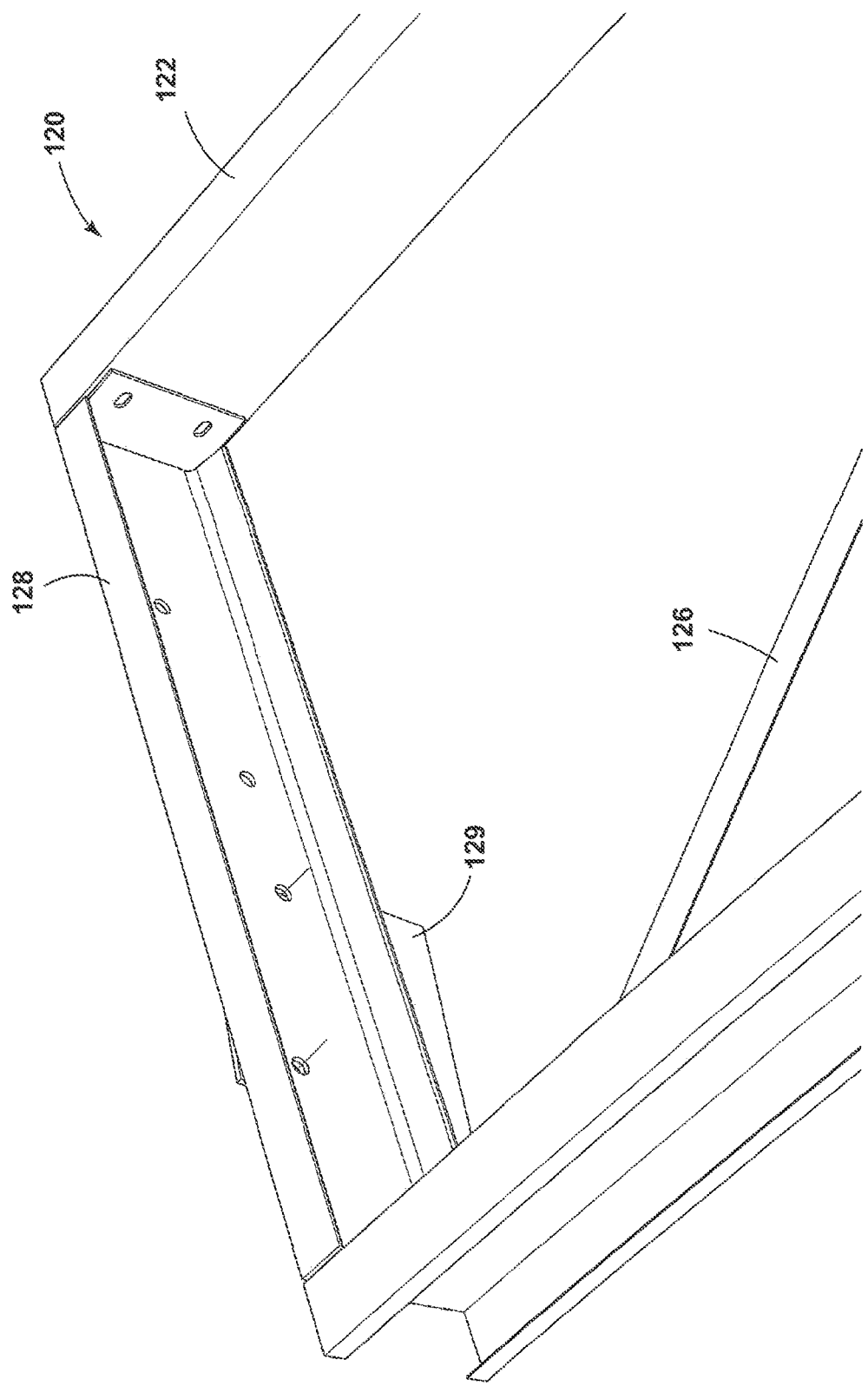
FIG. 13 shows a mounting configuration for mounting a minor frame to a major frame at a non-zero angle.

Referring now to FIGS. 13, there is shown minor frame 120, which again, carries PV panels 101. End bracket 128 is provided with fastener through holes shown, which allow end bracket 128 to be coupled, via fasteners, to mounting plate 129. In a preferred embodiment, there are a pair of fastener holes for each mounting plate 129, a first hole is arranged on a centerline of end bracket 128, and the second hole is arranged off the centerline to fix the angle minor frame 120 with respect to the edges of mounting spate 129, which is square. End bracket 128 has two pairs of holes, which advantageously allows minor frame to flipped in its orientation (i.e., installed in either the orientation shown in FIG. 13, or an inverted orientation)) during installation, which removes one alignment/orientation step during assembly.

Figure 14:
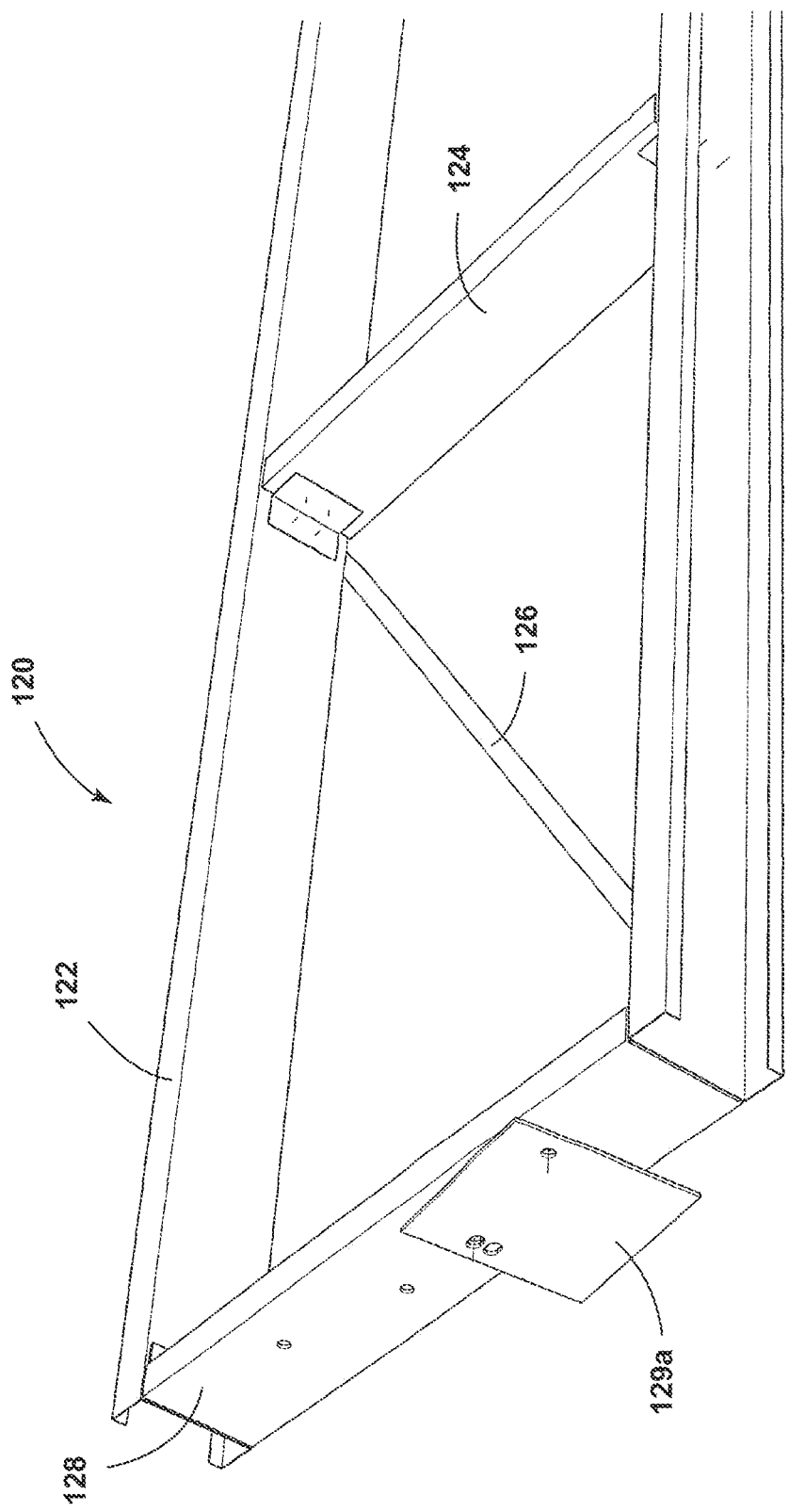
FIG. 14 shows another view of the mounting configuration of FIG. 13.

Referring now to FIG. 14, there is shown an arrangement for a fixed angle installation for minor frame 120, In the embodiment of FIG. 14, mounting plate 129 is a fixed angle mounting plate 129a, which has a pair of holes that define an axis that is parallel to two of its edges. Mounting plate 129a may be welded to an interior facing side of girder 112 of major frame 110. In the exemplary arrangement, mounting plate is welded such that its edges are square with respect to the edges of girder 112 (e.g., the bottom edge of mounting plate 129a is parallel to the long axis of girder 112). Mounting plate 129a is then bolted to end bracket 128 of minor frame 120. In alternative embodiments, mounting plate 129a is bolted to minor frame 120 prior to welding to major frame 110. A pair of mounting plates are used at either end (i.e., the short ends) of minor frame 120, and thus may serve to displace or offset minor frame 120 from the plane of major frame 110, and more importantly, impart a non-zero to the plane of minor frame 120 with respect to the plane of major frame 110, as shown in FIG. 1.

Figure 15:
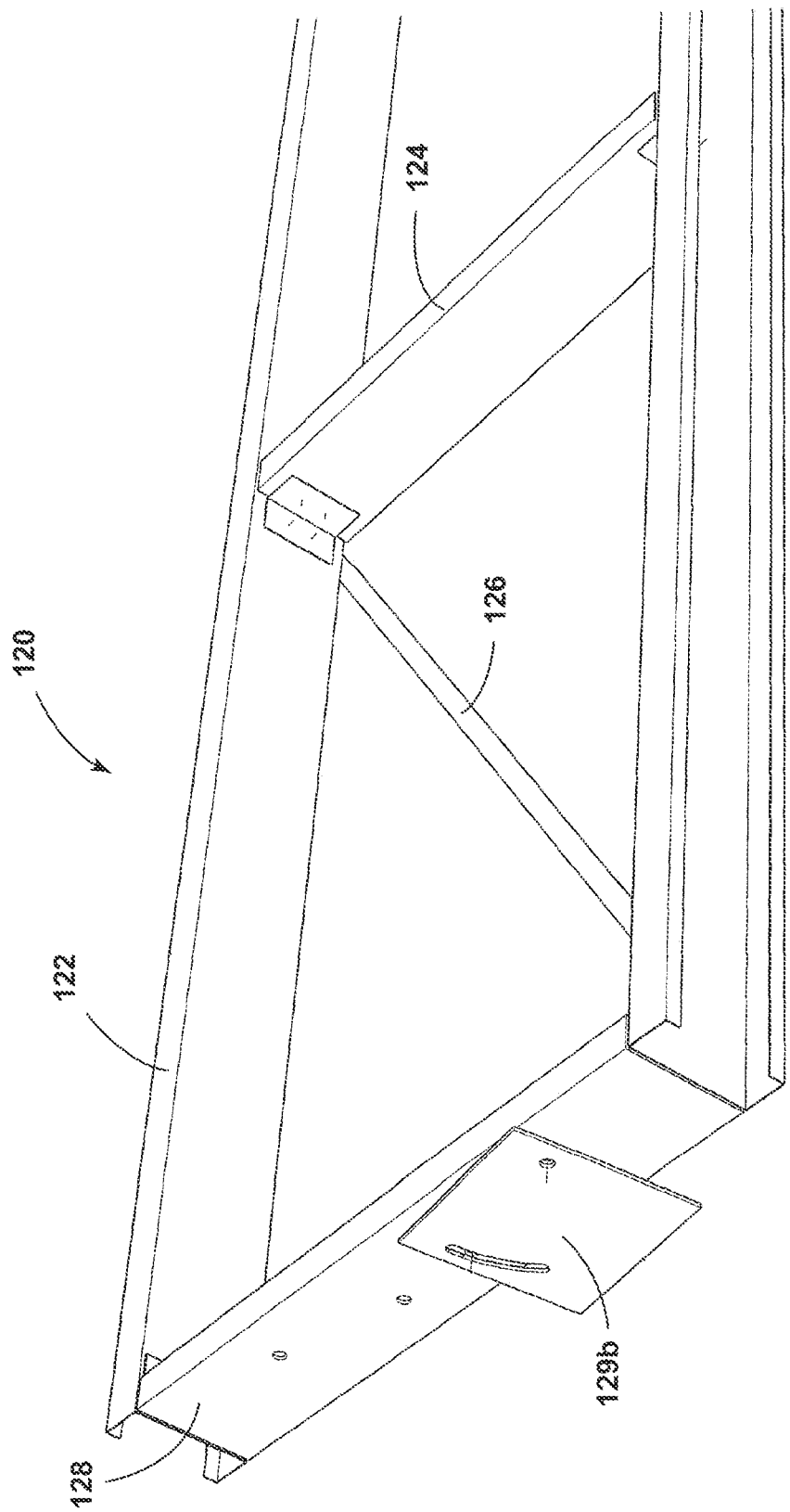
FIG. 15 shows an alternative mounting configuration for mounting a minor frame to a major frame at a variable angle.

Referring now to FIG. 15, there is shown an arrangement having a mounting plate 129b that has a curved slot for receiving a mounting bolt rather than a hole. The curved slot enables the plate to be rotated at a selectable angle before being bolted into place. The resulting assembly, as with FIG. 14, can then be welded to a girder 112 of the major frame 110. The arrangement of FIG. 15 enables the angle of minor frame 120 with respect to major frame 110 to be set in the field, whereas, in the arrangement of FIG. 14, this angle is predetermined according to the placement of the fastener holes in mounting plate 129a, which will be determined during fabrication of the parts prior to installation.

Figure 16A:
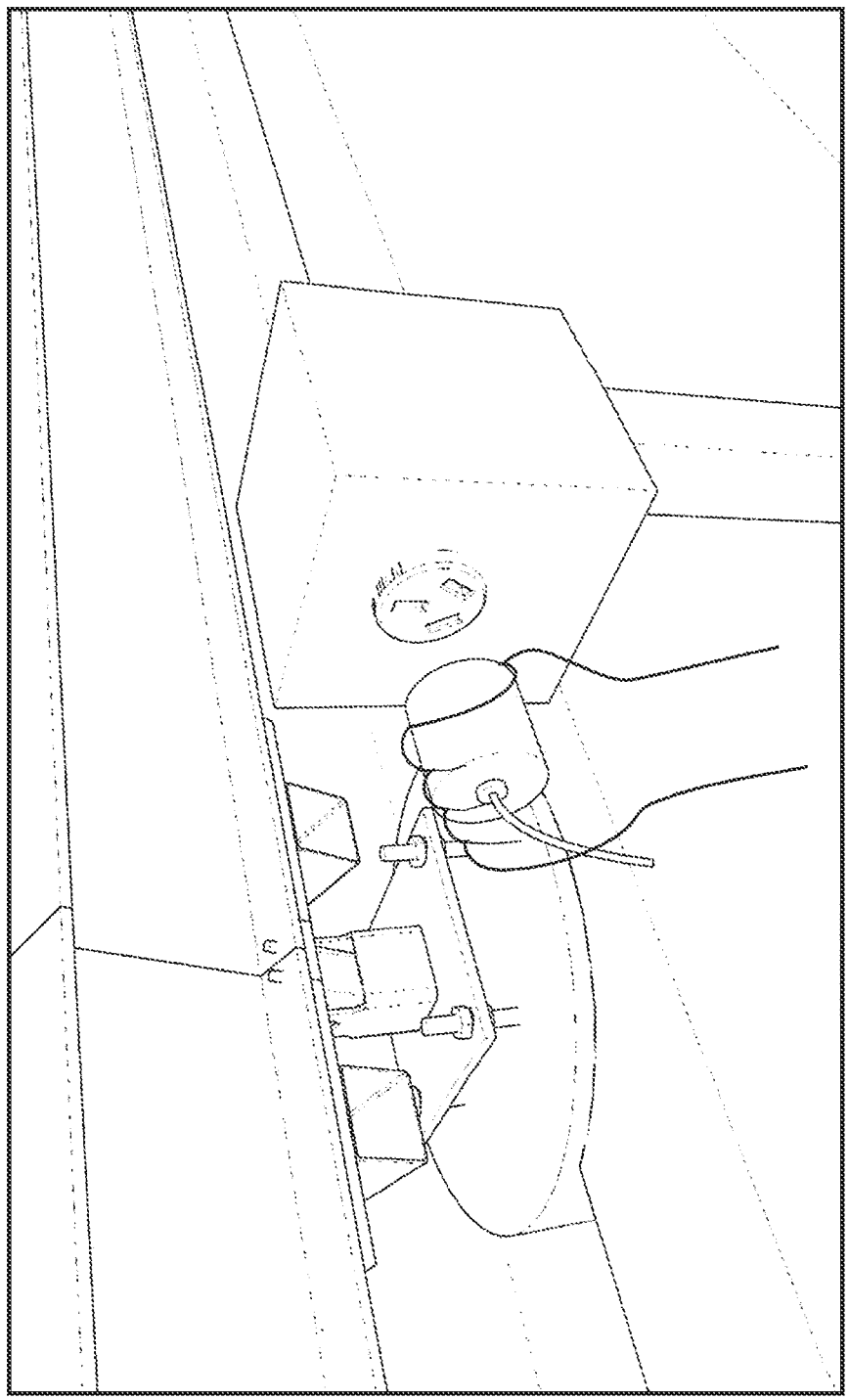
FIGS. 16a and 16b show steps of a support structure section disassembly procedure according to inventive embodiments.
Figure 16B:
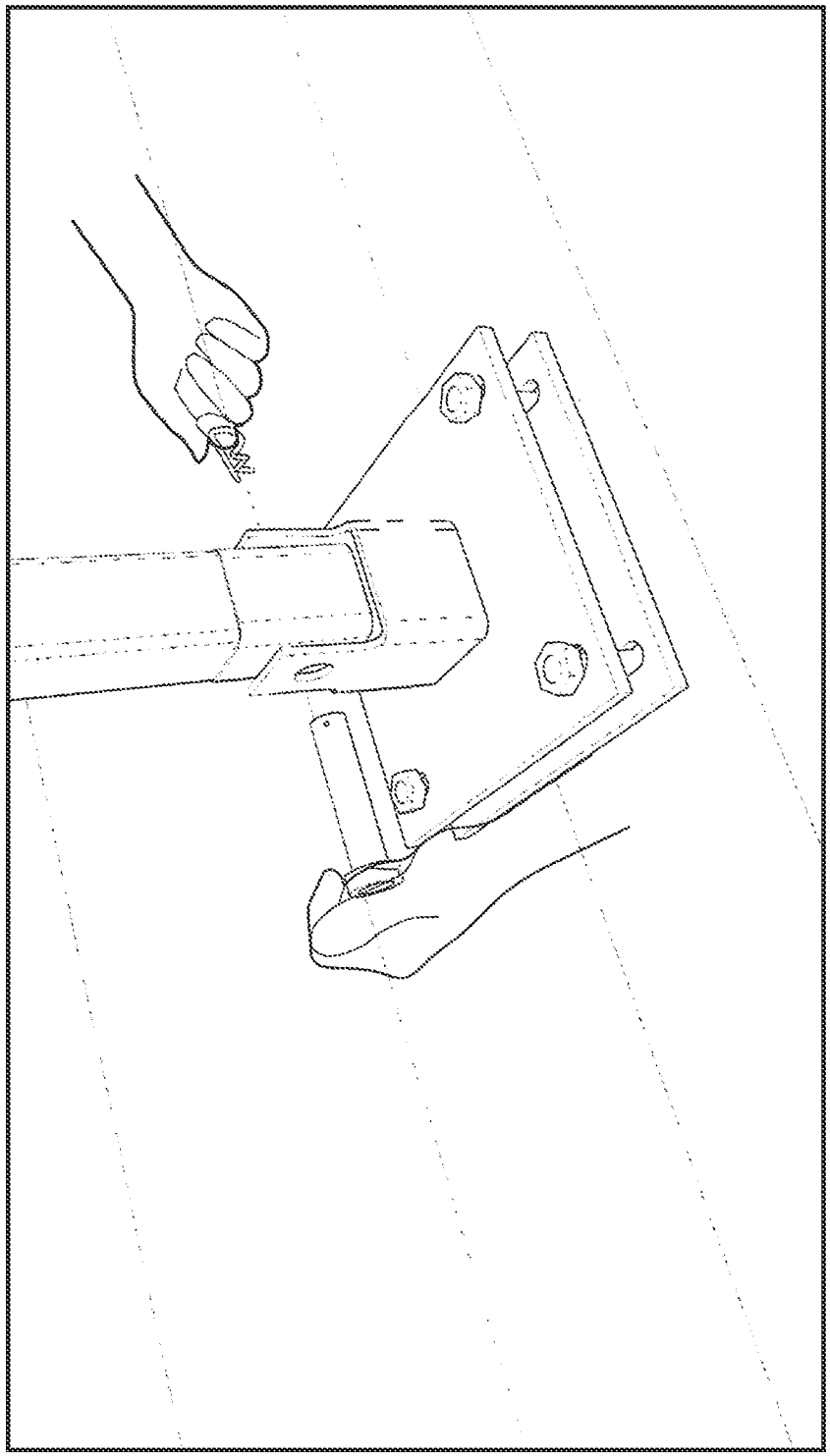

FIGS. 16a and 16b show exemplary structure disassembly steps according to an inventive embodiment. It is contemplated that a PV installation using a support structure disclosed herein (e.g., a PV installation using a structure, or structure section as shown above with regard to FIG. 1), includes one or more electrical interfaces. The electrical interfaces may take several forms. For example, all panels on an installation (e.g., installation 100 in FIG. 1) may be electrically coupled in DC, and one or more external DC connections may be provided for the installation. These external DC connections may be connected to adjacent installations in a daisy chain arrangement, or may be connected to an external bus. Alternatively, all panels in an installation or installation section may be connected to an inverter for DC/AC conversion, and the installation's electrical output may be connected to adjacent installations in a daisy chain arrangement or to an external bus. Alternatively, each panel in the installation, or each set of panels within a minor frame may be connected to its own inverter, and the resulting AC power is then combined across the installation, and then connected externally, to adjacent panels and/or to an external bus.

FIG. 16a shows an exemplary external electrical for an installation (e.g., 100) according to one of the preferred embodiments. In the embodiment of FIG. 16a, an external AC power connection is provided for the installation. The AC power connection comprises an electrical cable and a connector, and is electrically downstream from one or more inverters located on the installation. The connector from the installation (in this case a male, three phase connector) is electrically coupled to a power bus external to the installation, which power bus may also receive AC power from other installations (e.g., adjacent installations 100 along the subject section of canal). In one embodiment, the AC power bus runs alongside the canal for the length of the PV project, gathering AC power from the installed installations and supplying that power to, for example, a step up transformer station, power storage facility, electrical loads (e.g., pumps), or a grid connection. As can be seen, the installation of FIG. 16a may be easily electrically disconnected from the overall installation bus if the installation section (100) needs to be temporarily removed or pivoted. Such a disconnection can be done without interrupting the supply of power by adjacent installation sections, which remain connected to the bus.

FIG. 16b shows that support structures according to inventive embodiments can be easily disassembled by hand, or with the use of simple of hand tools. In the example of FIG. 16b, a hinge pin, that has been secured to a foundation joint with a cotter pin, is easily removed prior to pivoting up or removal of the support structure.

Figure 17Q:
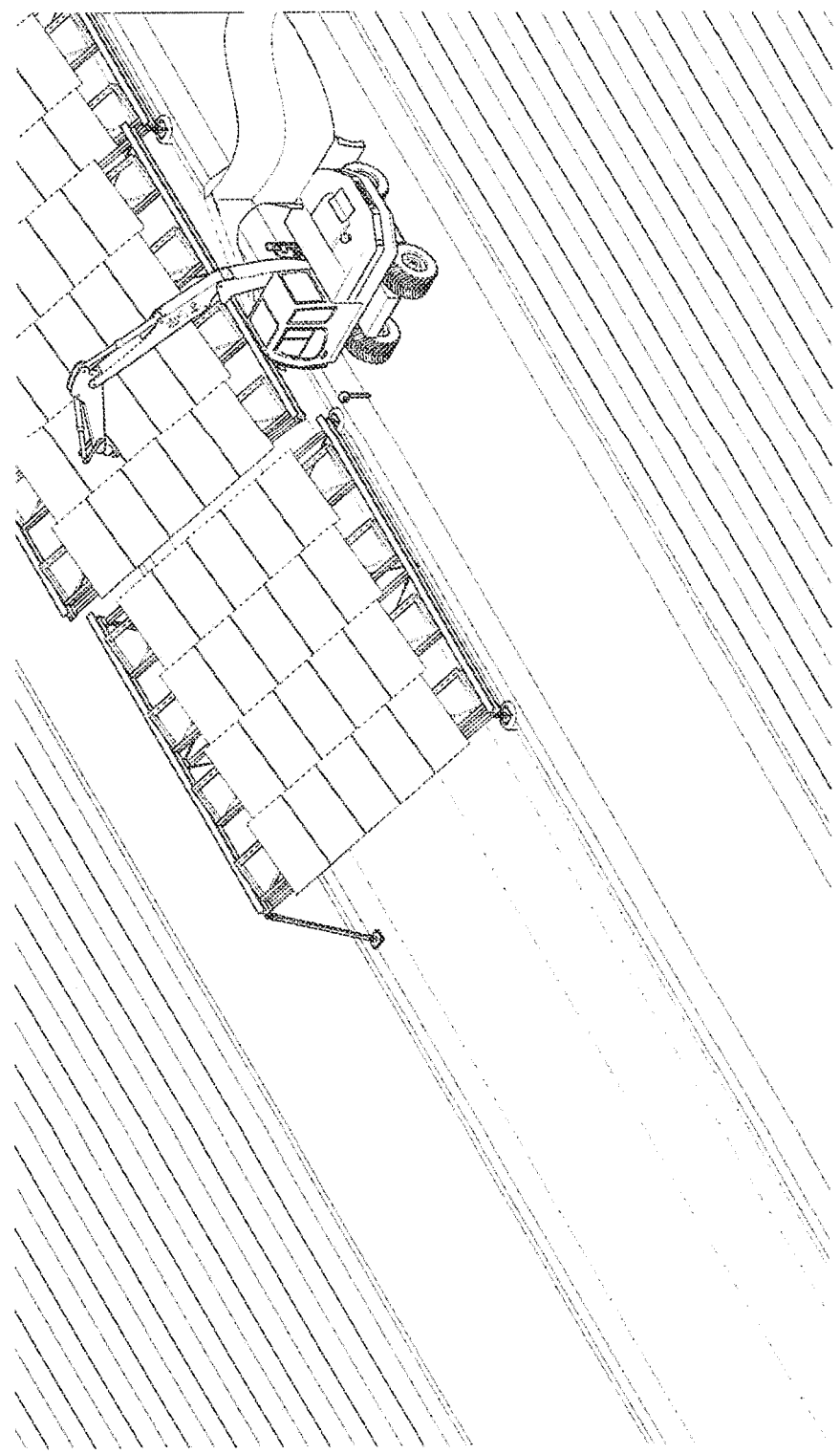
FIGS. 17a-e show exemplary canal maintenance procedures enabled by certain embodiments of the invention.
Figure 17B:
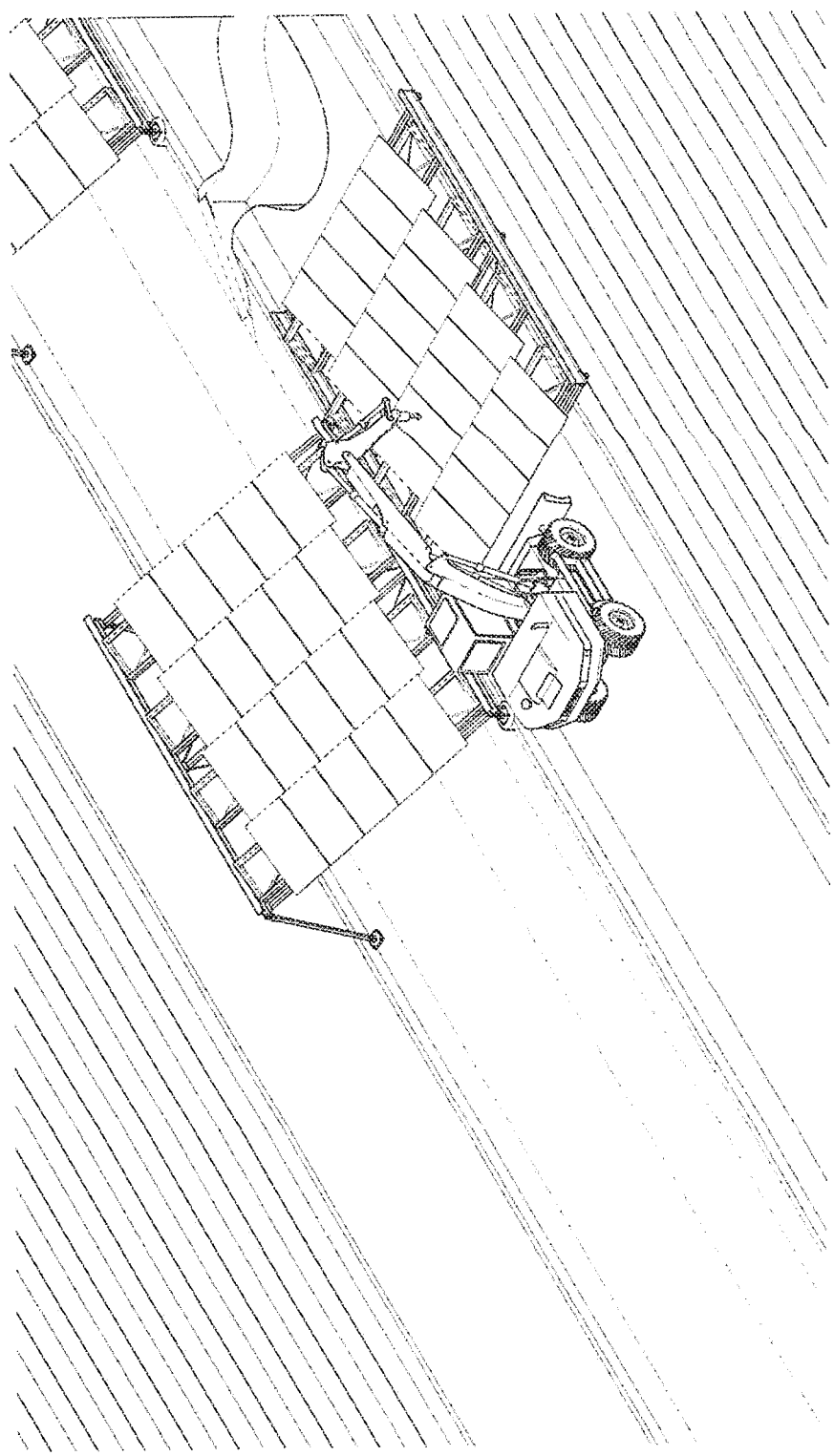
Figure 17C:
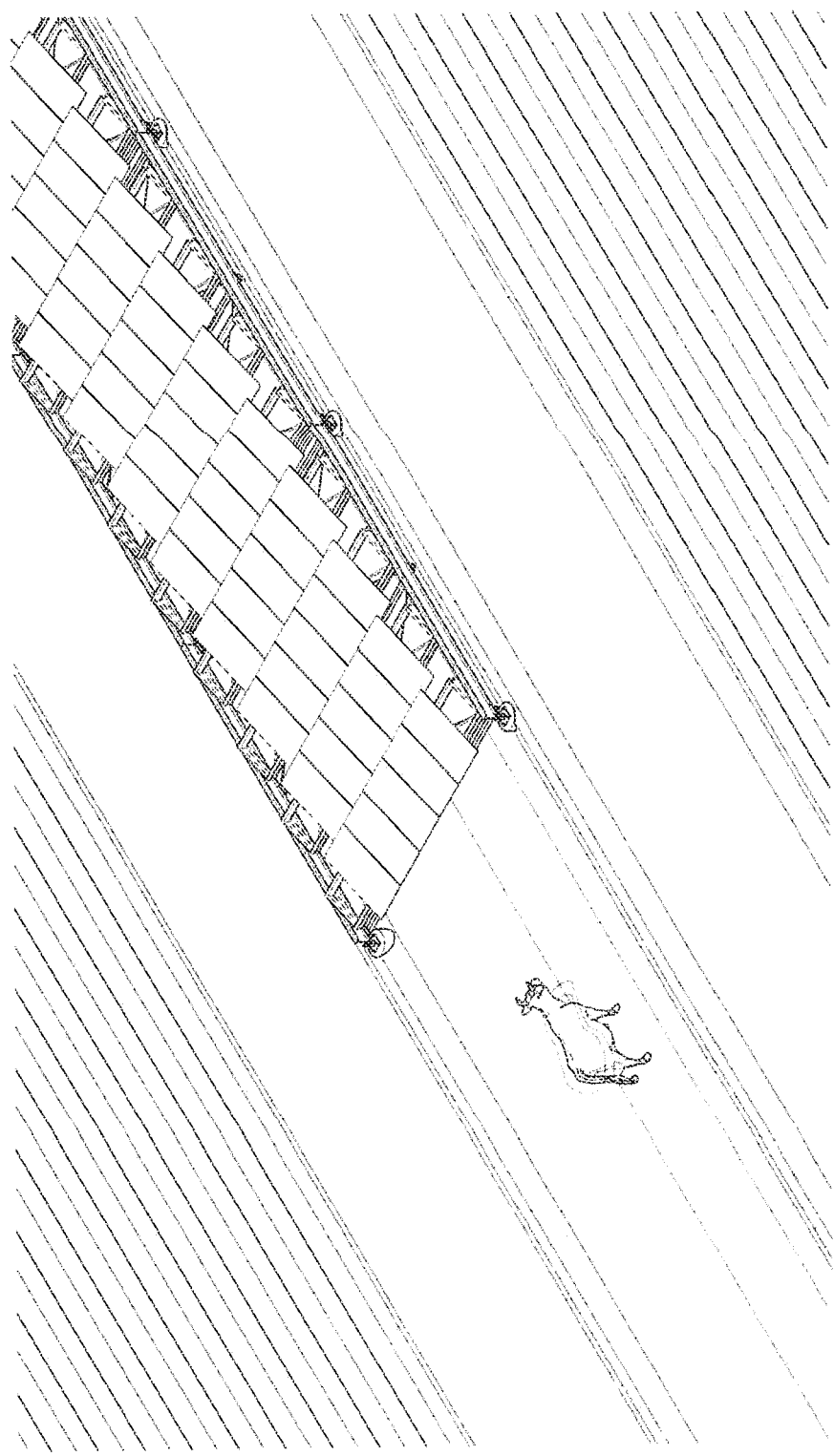
Figure 17A:
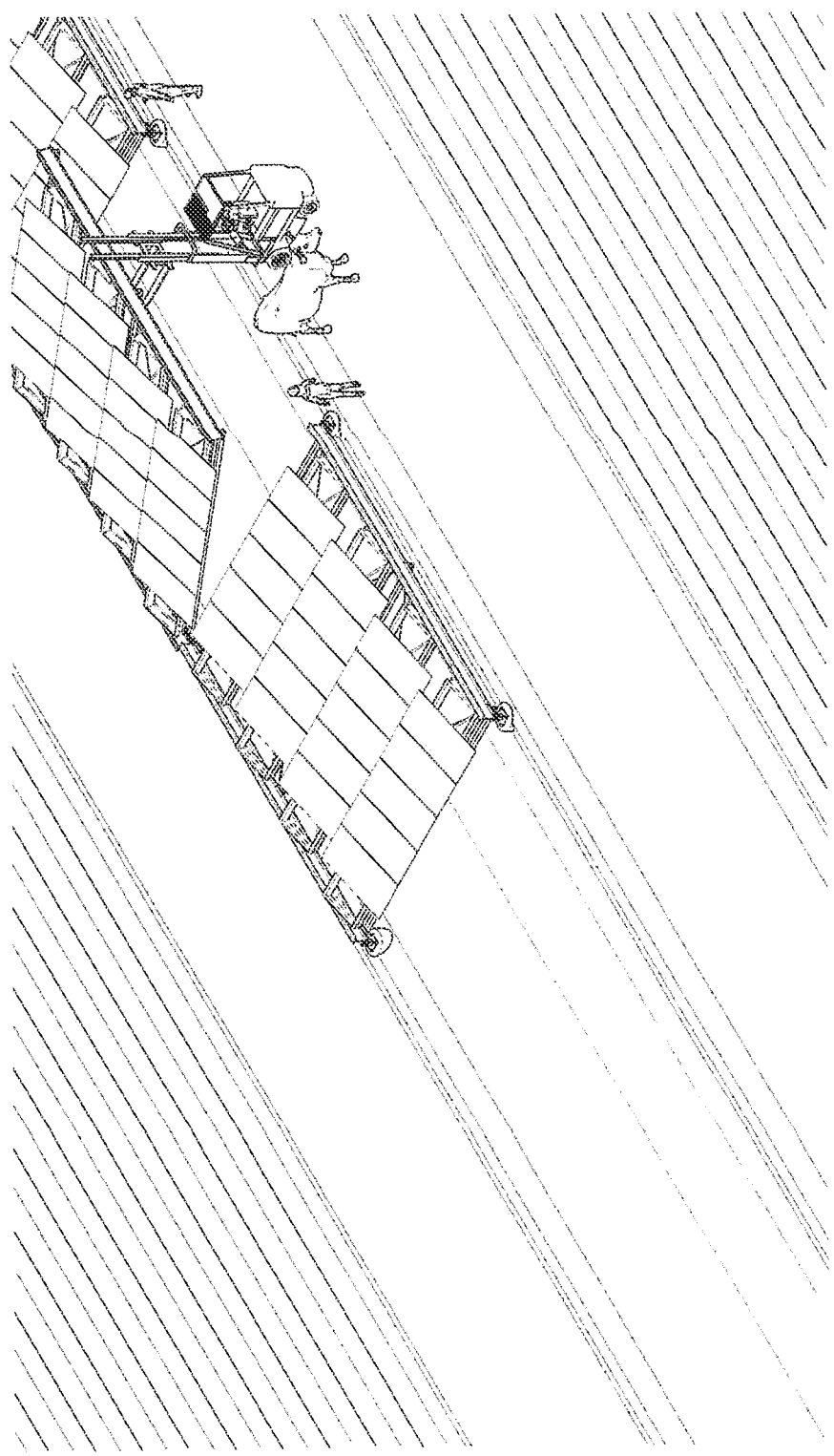
Figure 17E:
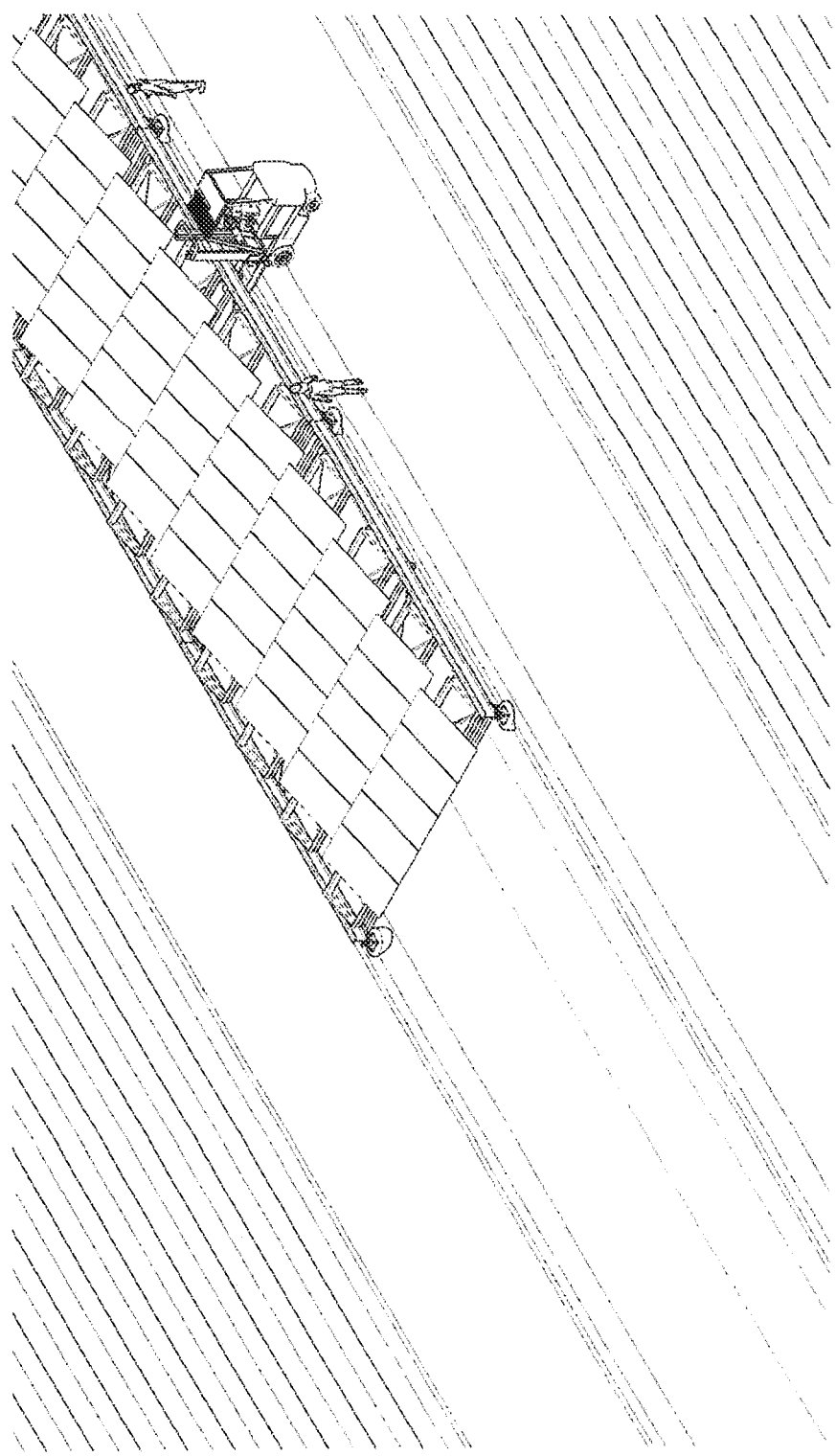

As set forth above, a significant advantage to the mounting structures disclosed herein is that they permit canal maintenance personnel to quickly and easily mechanically and electrically disconnect panel support sections, and either remove them or pivot them on their hinged connections to gain access to the underlying canal. Exemplary procedures for using the inventive embodiments for canal access and maintenance are illustrated in FIGS. 17a-e. In FIGS. 17a and b, there is shown removal of a support structure with a light mobile crane for repairing a canal breach. The support structure is rendered removable by removal of hinge pins at the four corner foundation joints, and electrically disconnecting the section from adjacent sections or from the power bus, as shown above, for example, in FIGS. 16a-b. FIG. 17c shows a foreign object in a canal, and FIGS. 17d-e illustrate the ability to pivot a support structure section upward using a forklift for removal of the object. In FIGS. 17d-e, the support structure has been temporarily disconnected at one side, and if necessary, has also been temporarily electrically disconnected, and the structure has been pivoted up to gain access to the canal below.

Figure 18:
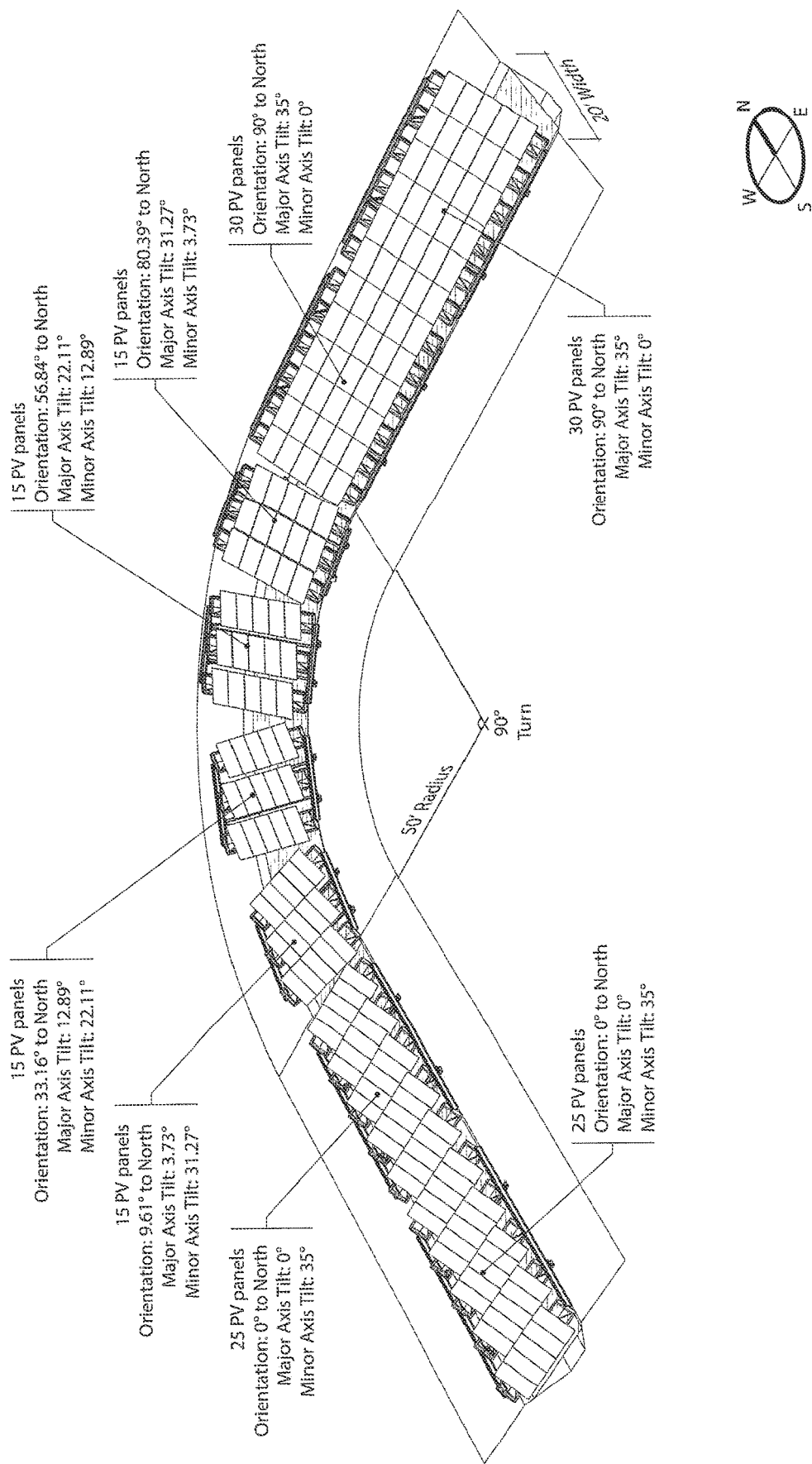
FIG. 18 shows a view of an exemplary PV installation over a canal using mounting structures according to inventive embodiments.
Figure 19:
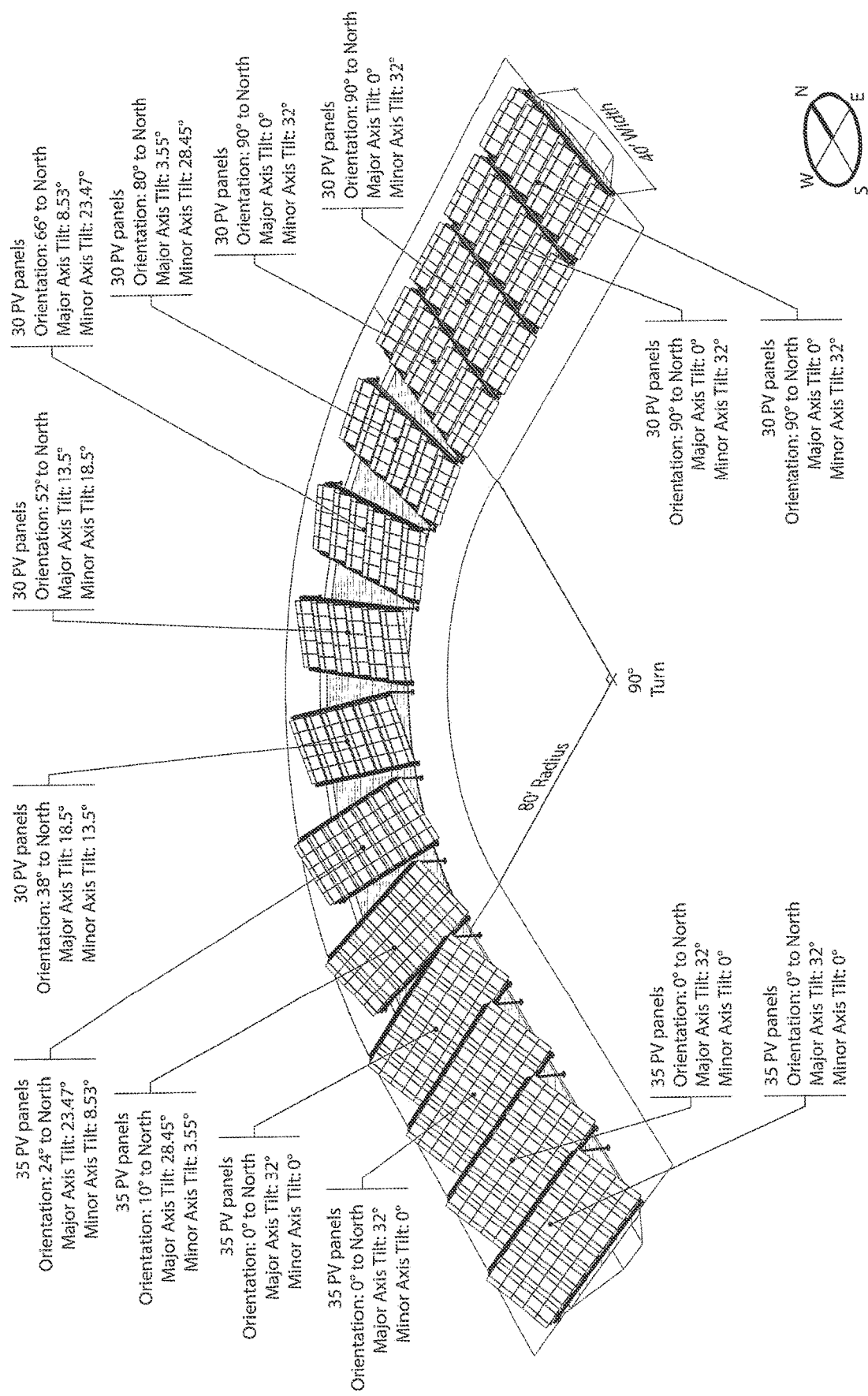
FIG. 19 shows a view of another exemplary PV installation over a canal using mounting structures according to inventive embodiments.

FIGS. 18 and 19 illustrate exemplary solar panel installations across a canal using mounting structures described above. For solar installations in the northern hemisphere, it is considered desirable to tilt fixed PV panels to the south at an angle equal to the latitude of the location of the installation (i.e., to make the angle the plane of the panel makes with the horizontal equal to the latitude of the location of the installation). Achieving latitude tilt angles for PV panels in canal spanning structures is challenging because a canal can have curves and resulting orientation changes along its length. It will be appreciated that the mounting system of the present invention, by providing span structures that can be easily configured to impart both a major and a minor angle of inclination to a mounted PV panel overcome this challenge in an efficient manner.

Referring now to the example installation of FIG. 18, there is shown a canal portion that starts (on the left hand side of the page) running straight north-south. For this portion, mounting structures spanning the canal are provided that have a major angle (the angle made by the major frame) that is zero, and a minor angle (imparted by the minor frames) equal to the location latitude (35 degrees north latitude in this example). As the canal begins to bend to the east, major and minor angles are chosen to create a compound angle that maintains the panels at latitude inclination. At the point where the canal is running east west, the minor angle is zero, and latitude inclination is imparted by the major angle of the major frame, which is now 35 degrees. In the example of FIG. 18, the long axis of the major frame is parallel to the edge of the canal, while the long axes of the minor frames is perpendicular to the edge of the canal. This situation may arise when the canal width is relatively small and is easily spanned. In these circumstances, fewer rectangular support structures of a standard size may be used to cover the canal.

FIG. 19 provides an example of spanning a wider canal. In this example, the long axis of the major fame is perpendicular to the edge of the canal, and the long axes of the minor frames are parallel to the edge of the canal. The example location for the location of FIG. 19 is at 32 degrees north latitude. As can be seen, the major and minor tilt axes of the major and minor frames enable inclination of the panels at approximately at 32 degree angle to the south throughout the bend of the canal.

It will be seen in FIGS. 18, 19 and 1 that, for each support structure (i.e., each major frame), all minor frames have the same tilt angle, but this is not a requirement. Different minor frames may have a different tilt angle within a frame. Additionally, while it may be desirable for reasons of manufacturing efficiency to make all major frames the same dimensions, this is not a requirement. As FIG. 18 shows, some frames may be shorter than others, which may be useful in providing better granularity to match the curve of a canal.

The person of ordinary skill will recognize that design considerations other than simply maintaining latitude inclination while shading the underlying canal may come into play when designing an installation like those of FIGS. 18 and 19. Co-owned U.S. patent application Ser. No. 17/189,049, which is incorporated herein by reference in its entirety, describes an optimization methodology for placement of solar panels across a space using a "sawtooth bowstring structure" (see FIGS. 2G and 9C). Support structures disclosed herein are usable for those structures, and the optimization methodologies disclosed in the aforementioned application are usable to determine panel orientation, panel spacing, spacing between the minor frames within a major frame, spacing of major frames, overall height of major frames, etc., for the structures and installations disclosed herein.

A rudimentary design method for a canal spanning solar installation using support structures disclosed herein follows. For simplicity, this discussion assumes (1) a single pre-selected panel size which is used for all structures and (2) a single major frame size (as in FIG. 19).

First, build a geographical model of a canal to be spanned.

Second, determine major frame size as a function of (a) maximum span width and (b) the size of the panels selected for the installation. An example of this would be to design a major frame having a first dimension length capable of spanning a designed-for distance, (allowing for the need for anchors on either side), and a second dimension length determined by a number of solar panels that can fit (along with associated mounting space) within the major frame when those panels are parallel to the plane of the frame. A constraint on both dimension lengths may be the weight of the structure, which is limited by the fact that it is unsupported between the anchor points.

Next, determine the number and dimensions of the minor frames to be used. This may be determined by the major frame maximum span width (which determines one maximum dimension of the minor frames) and the number of panels per major frame (which determines the second maximum dimension of the minor frames—assume the minor frame carries a single row of panels).

Next, determine the initial placement of structures along a first set of canal locations, attempting to achieve close packing to achieve maximum coverage. Requiring that the frames be square to the edges of the canal, on average, is one possible constraint that may be applied during this step.

Next, for each structure, given its location along the canal (and the underlying direction and orientation of the canal), compute the major and minor angles of the major and minor frames to achieve approximate latitude tilt for all the panels within the major frame, or approximate latitude tilt for all panels across the major frame, on average. As used herein, approximate latitude tilt means that the panels, individually or on average, are inclined to the south or north (depending on the hemisphere of the installation) to within +/−5 degrees of the latitude of the location of installation. Constraints that may be applied here include, for example, requiring that all minor frames within a major frame be inclined at the same angle.

Next, perform a shading analysis to determine whether northerly structures may be shaded by adjacent southerly structures, and if so, make minor spacing adjustments to eliminate shading.

Next, provide a unique identifier for each support structure, and generate a set of instructions for fabricating the constituent parts of the support structure, including columns of a length, and mounting plates of a configuration uniquely capable of achieving the design-for tilts for that particular structure. The instructions may be computer executable instructions executable by a programmable processor in communication with cutting equipment, such as automated laser or plasma cutting equipment. The unique identifier for all parts associated with a major frame may be inscribed, e.g., by laser inscribing, on the individual parts for ease of assembly. Additionally, assembly sequence instructions may be similarly inscribed on individual parts.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the terms "joined", "coupled", "connected to", "attached to" generally mean the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature or may be removable or releasable in nature unless otherwise stated. While many connections between components have been described herein as "welds" or made by "welding", and others have been described as being made by fasteners, these descriptions are not limited. Any suitable method of mechanically joining components is within the scope of the disclosure.

It is also important to note that the construction and arrangement of the elements of the invention as shown in the examples are illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Thus, the exemplary structures disclosed herein are for illustrative purposes and are not to be construed as limiting. In addition, variations and modifications can be made on the aforementioned structures without departing from the concepts of the present invention and such concepts are intended to be covered by the following claims unless these claims by their language expressly state otherwise.

What is claimed is:

1. A support structure for carrying a plurality of photovoltaic panels and spanning an underlying space, the support structure comprising;
    a major frame having a first dimension greater than a predetermined distance to be spanned, the major frame defining a first plane, the major frame having a first side and a second, opposite side;
    a plurality of minor frames configured to be supported by the major frame, each minor frame defining a second plane, and each minor frame being coupled to the major frame such that the second plane makes a predetermined angle with the first plane;
    a plurality of ground anchors coupled to and proximate to ground and arranged to provide vertical support at a plurality of points around an outside perimeter of the major frame;
    wherein, the major frame is coupled to one or more of a plurality of first ground anchors by hinged connections along the first side of the major frame;
    wherein the major frame further comprises a plurality of weld tubes arranged along the second side and fixedly coupled to the major frame, the weld tubes extending downwardly away from the plane of the major frame, the weld tubes having a maximal transverse outer dimension; and
    wherein second ground anchors support the second side of the major frame and are proximately coupled to anchor joints comprising upwardly extending mutually parallel tabs having a maximal transverse inner spacing greater than the maximal transverse outer dimension of the weld tubes, the tabs sized to accept the weld tubes arranged on the second side of the major frame between the tabs and form a disconnectable, hinged connection thereto;
    and wherein the support structure includes columns having a lower end having the same transverse dimensions as the weld tubes and an upper end having a column joint, the column joint comprising upwardly extending mutually parallel tabs having a maximal transverse inner spacing greater than the maximal transverse outer dimension of the weld tubes, the lower end being arranged between the tabs of the anchor joints and the weld tubes being arranged between the tabs of the column joints such that disconnectable, hinged connections are formed between the columns and the major frame at the second side and between the columns and the anchor joints.

2. The structure of claim 1, wherein, each of the connections between the major frame and the ground anchors is disconnectable such that the major frame can be disconnected from the ground anchors.

3. The structure of claim 1, wherein each disconnectable, hinged connection between each anchor joint and a corresponding weld tube comprises a hinge pin insertable though apertures in the anchor joint tabs and corresponding apertures in walls of the weld tubes such that the tube may rotate around the hinge pin.

4. The structure of claim 3, wherein the hinge pin is temporarily securable to each anchor joint with one of a nut or a cotter pin.

5. The structure of claim 4, wherein the major frame is coupled to the anchor joint by passing the hinge pin through the anchor joint and through a weld tube coupled to the major frame.

6. The structure of claim 1, wherein the upper end of the column is coupled to the major frame through the hinged connection comprising the column joint configured to receive a hinge pin, and a hinge pin temporarily securable to the column joint.

7. The structure of claim 6, wherein the hinge pin is temporarily securable to the column joint with one of a nut or a cotter pin.

8. The structure of claim 6, wherein the major frame is coupled to the column joint by passing the hinge pin through the column joint and through the weld tube coupled to the major frame.

9. The structure of claim 1, wherein the major and minor frames are rectangular, and wherein the one or more of the plurality of ground anchors are configured to provide vertical support to the corners of the major frame.

10. The structure of claim 1, further including, for each minor frame, a pair of mounting plates that, when coupled to the major frame and the minor frame, determine the angle the second plane makes with respect to the first plane.

11. The structure of claim 10, wherein each of the pair of mounting plates includes an arcuate slot through which a minor frame can be secured to the mounting plate so as to permit an installer of a minor frame to couple the minor frame to the major frame such that the second plane is set at an installer-selectable angle within a range of angles relative to the first plane.

12. A photovoltaic panel installation capable of spanning a space, the installation comprising:

a plurality of minor frames, each carrying a plurality of solar panels, the minor frames comprising a rectangular frame having two opposing long ends and two opposing short ends;

a rectangular major frame configured to support the plurality of minor frames;

a plurality of support columns arranged along one long end of the major frame between the major frame and the ground;

a first set of hinged connections on a first side of the major frame proximate to the ground, a second set of hinged connections on a second side of the major frame, the second set of hinged connections being configured to couple the second side of the major frame to one or more vertical columns such that the major frame is inclined at a non-zero angle relative to the horizontal, and a third set of hinged connections between lower ends of the vertical columns and ground anchors proximate to the ground and wherein the minor frames are inclined at a non-zero angle with respect to a plane defined by the major frame.

13. The installation of claim 12, wherein a combination of an angle of inclination of the major frame with respect to the horizontal and an angle of inclination of a minor frame with respect to a plane defined by the major frame results in a photovoltaic panel carried by the minor frame being inclined at an angle approximately equal to a latitude of the installation.

14. The installation of claim 12, wherein the first, second and third sets of hinged connections are disconnectable.

15. The installation of claim 12, further including an electrical inverter electrically coupled to one or more of the plurality of solar panels, the electrical inverter having an AC output including a disconnectable terminal.

* * * * *